United States Patent
Aoyama et al.

(10) Patent No.: US 10,251,186 B2
(45) Date of Patent: *Apr. 2, 2019

(54) COMMUNICATION TERMINAL AND METHOD WITH PRIORITIZED CONTROL INFORMATION

(71) Applicant: Optis Wireless Technology, LLC, Plano, TX (US)

(72) Inventors: Takahisa Aoyama, Kanagawa (JP); Joachim Loehr, Langen (DE)

(73) Assignee: Optis Wireless Technology, LLC, Plano, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/622,586

(22) Filed: Jun. 14, 2017

(65) Prior Publication Data

US 2017/0280470 A1    Sep. 28, 2017

Related U.S. Application Data

(63) Continuation of application No. 14/843,319, filed on Sep. 2, 2015, now Pat. No. 9,713,162, which is a
(Continued)

(30) Foreign Application Priority Data

Feb. 1, 2008   (JP) .................................. 2008-023171

(51) Int. Cl.
*H04W 72/04*   (2009.01)
*H04W 28/02*   (2009.01)
(Continued)

(52) U.S. Cl.
CPC ....... *H04W 72/10* (2013.01); *H04W 28/0268* (2013.01); *H04W 28/0278* (2013.01);
(Continued)

(58) Field of Classification Search
None
See application file for complete search history.

(56) References Cited

U.S. PATENT DOCUMENTS 6,640,105 B1   10/2003 Shin
6,751,227 B1   6/2004 Ahmavaara et al.
(Continued)

FOREIGN PATENT DOCUMENTS

CN   1756258 A   4/2006
CN   1934803 A   3/2007
(Continued)

OTHER PUBLICATIONS

Pelletier et al., "Method and Arrangement in a Telecommunication System", U.S. Appl. No. 61/024,731, filed Jan. 30, 2008.*
(Continued)

*Primary Examiner* — Gregory B Sefcheck
(74) *Attorney, Agent, or Firm* — Nixon & Vanderhye P.C.

(57) ABSTRACT

A communication terminal adjusts the transmission timing of data transmitted to a base station so that the base station can receive the data within a predetermined delay time. The communication terminal includes a reception section for receiving priority of MAC control information transmitted from the base station, a priority control section for defining the relationship between the priority of the MAC control information and priority assigned to DRB and SRB, and a transmission message generation section for controlling so as to transmit information having a high priority early in accordance with the relationship between the priorities defined by the priority control section. According to the communication terminal, a comparison is made between the priority of the MAC control information and the priority
(Continued)

(a) priority order of MAC control elements (b) signalling of boundary info assigned to the DRB and the SRB, whereby it is made possible to control what information is to be transmitted as desired.

11 Claims, 30 Drawing Sheets

Related U.S. Application Data continuation of application No. 13/722,742, filed on Dec. 20, 2012, now Pat. No. 9,161,368, which is a continuation of application No. 12/865,674, filed as application No. PCT/JP2009/000370 on Jan. 30, 2009, now Pat. No. 8,396,081.

(51) Int. Cl.
| | |
|---|---|
| H04W 74/08 | (2009.01) |
| H04W 72/10 | (2009.01) |
| H04W 76/27 | (2018.01) |
| H04W 76/11 | (2018.01) |
| H04W 28/10 | (2009.01) |
| H04W 36/08 | (2009.01) |
| H04W 72/12 | (2009.01) |
| H04W 56/00 | (2009.01) |
| H04W 88/02 | (2009.01) |
| H04W 88/08 | (2009.01) |

(52) U.S. Cl.
CPC .......... *H04W 28/10* (2013.01); *H04W 36/08* (2013.01); *H04W 72/0406* (2013.01); *H04W 72/1242* (2013.01); *H04W 74/085* (2013.01); *H04W 74/0833* (2013.01); *H04W 76/11* (2018.02); *H04W 76/27* (2018.02); *H04W 56/00* (2013.01); *H04W 72/1278* (2013.01); *H04W 88/02* (2013.01); *H04W 88/08* (2013.01)

(56) References Cited

U.S. PATENT DOCUMENTS

| | | |
|---|---|---|
| 6,944,178 B1 | 9/2005 | Charriere et al. |
| 7,197,145 B2 | 3/2007 | Yi |
| 7,292,863 B2 | 11/2007 | Chen et al. |
| 7,369,508 B2 | 5/2008 | Parantainen et al. |
| 7,551,637 B2 | 6/2009 | Damnjanovic et al. |
| 7,706,406 B2 | 4/2010 | Jang |
| 7,729,719 B2 | 6/2010 | Bergstrom et al. |
| RE41,773 E | 9/2010 | Ahmavaara et al. |
| 7,804,850 B2 | 9/2010 | Sebire et al. |
| 7,860,087 B2 | 12/2010 | Kim |
| 7,864,722 B2 | 1/2011 | Yi et al. |
| 7,873,006 B2 | 1/2011 | Yi et al. |
| 7,894,395 B2 | 2/2011 | Yi et al. |
| 7,945,051 B2 | 5/2011 | Yi |
| 7,948,936 B2 | 5/2011 | Lohr et al. |
| 8,005,040 B2 | 8/2011 | Sebire et al. |
| 8,081,662 B2 | 12/2011 | Chun et al. |
| 8,111,639 B2 | 2/2012 | Imamura et al. |
| 8,165,066 B2 * | 4/2012 | Tseng ................ H04W 28/065 370/328 |
| 8,175,039 B2 | 5/2012 | Heo et al. |
| 8,280,424 B2 | 10/2012 | Sarkkinen et al. |
| 8,358,643 B2 | 1/2013 | Ahluwalia |
| 8,396,081 B2 | 3/2013 | Aoyama et al. |
| 8,462,717 B2 | 6/2013 | Terry |
| 8,472,456 B2 | 6/2013 | Damnjanovic et al. |
| 8,488,551 B2 * | 7/2013 | Pelletier ............ H04W 72/1252 370/329 |
| 8,554,240 B2 | 10/2013 | Heo et al. |
| 8,705,352 B2 | 4/2014 | Chiu |
| 8,767,647 B2 | 7/2014 | Heo |
| 8,797,863 B2 | 8/2014 | Takeshita |
| 8,848,580 B2 | 9/2014 | Park |
| 9,215,731 B2 * | 12/2015 | Kitazoe ............... H04W 74/004 |
| 9,253,798 B2 | 2/2016 | Pani |
| 9,326,277 B2 * | 4/2016 | Heo ....................... H04L 5/001 |
| 2005/0047416 A1 | 3/2005 | Heo et al. |
| 2005/0201281 A1 | 9/2005 | Damnjanovic et al. |
| 2006/0013268 A1 | 1/2006 | Terry |
| 2006/0120404 A1 | 6/2006 | Sebire et al. |
| 2006/0148483 A1 | 7/2006 | Howard et al. |
| 2006/0209896 A1 | 9/2006 | Choi et al. |
| 2006/0280145 A1 | 12/2006 | Revel et al. |
| 2007/0121542 A1 | 5/2007 | Lohr et al. |
| 2007/0230476 A1 | 10/2007 | Ding |
| 2008/0026738 A1 | 1/2008 | Jiang |
| 2009/0088195 A1 * | 4/2009 | Rosa ................ H04W 72/1284 455/507 |
| 2009/0175229 A1 * | 7/2009 | Tseng ................ H04W 28/065 370/329 |
| 2009/0201864 A1 | 8/2009 | Ahluwalia |
| 2010/0098011 A1 | 4/2010 | Pelletier et al. |
| 2010/0220666 A1 | 9/2010 | Imamura et al. |
| 2010/0255850 A1 | 10/2010 | Kaukoranta et al. |
| 2011/0019604 A1 * | 1/2011 | Chun .................... H04L 1/1887 370/312 |
| 2012/0099549 A1 | 4/2012 | Imamura et al. |
| 2017/0289986 A1 * | 10/2017 | Jin ...................... H04W 72/042 |

FOREIGN PATENT DOCUMENTS

| | | |
|---|---|---|
| CN | 101238659 A | 8/2008 |
| EP | 1 257 096 A2 | 11/2002 |
| EP | 1 441 479 A2 | 7/2004 |
| EP | 2 136 598 A1 | 12/2009 |
| JP | 2004-172907 A | 6/2004 |
| JP | 2004-312681 A | 11/2004 |
| JP | 2005-73276 A | 3/2005 |
| RU | 2 285 350 C2 | 10/2006 |
| WO | WO 03/019960 A1 | 3/2003 |
| WO | 2005/034418 A1 | 4/2005 |
| WO | WO 2005/125252 A1 | 12/2005 |
| WO | 2007/074841 A1 | 7/2007 |
| WO | 2007/091715 A1 | 8/2007 |

OTHER PUBLICATIONS

Kitazoe et al. "Methods and Apparatuses for Transfer of First Scheduled Transmission using Control Channel", U.S. Appl. No. 61/015,159, filed Dec. 19, 2007.*
English translation of Korean Notice of Preliminary Rejection dated Jan. 26, 2017 in KR application 10-2016-7011223.
VN Notice of Results of Substantive Examiner and English translation thereof dated Nov. 14, 2014 in VN application 1-2014-04119.
Malaysian Preliminary Examination Report dated May 16, 2016 in MY application PI 2015002013.
Malaysian Preliminary Examination Report dated May 16, 2016 in MY application PI 2015002014.
Singapore Examination Report dated May 18, 2016 in SG application 2011054632.
Korean Notice of Preliminary Rejection and English translation thereof dated Jun. 10, 2016 in Korean Application 10-2016-7011223.
Supplementary European Search Report dated Feb. 29, 2016 in EP Patent Application 09705415.9.
3GPP TS 36.331 V8.0.0 Technical Specification, 3$^{rd}$ Generation Partnership Project; Technical Specification Group Radio Access Network; Evolved Universal Terrestrial Radio Access (E-UTRA) Radio Resource Control (RRC) Protocol Specification (Release 8) ((Dec. 2007).
R2-07080510, TSG-RAN WG2 meeting #60bis, 3GPP Support Team, Draft Minutes of the 60$^{th}$ TSG-RAN WG2 Meeting (Jeju, Korea), 3$^{rd}$ Generation Partnership Project (3GPP), Mobile Competence Centre; 650, Route Des Lucioles; F-06921 Sophia-Antipolis Cedex, France, vol. RAN WG2, no Sevilla, Spain, Jan. 9, 2008.

(56) References Cited

OTHER PUBLICATIONS

Chinese Office Action and English translation thereof dated Jan. 14, 2014 in Chinese Patent Application 200980103901.0.
Chinese Office Action and English translation thereof dated Sep. 12, 2014 in Chinese Application 200980103901.0.
Korean Office Action and English translation thereof dated Nov. 20, 2014 in Korean Application 10-2010-7016343.
Korean Office Action and English translation thereof dated Apr. 17, 2015 in Korean Application 10-2010-7016343.
Korean Office Action and English translation thereof dated Apr. 17, 2015 in Korean Application 10-2015-7004418.
Written Opinion dated Mar. 13, 2015 in SG application 2011054632.
Search Report dated Mar. 13, 2015 in SG application 2011054632.
Official Notice and English translation thereof dated May 29, 2015 in VN Application 1-2014-04119.
Decision on Grant, dated Mar. 29, 2013 in Russian Application 2010136716/07.
Chinese Office Action dated Dec. 5, 2012 in Chinese Application 200980103901.0.
"3rd Generation Partnership Project; Technical Specification Group Radio Access Network; Medium Access Control (MAC) protocol specification (Release 8)," Technical Specification, 3GPP TS 25.321 V8.0.0, Dec. 2007.
"3rd Generation Partnership Project; Technical Specification Group Radio Access Network; Evolved Universal Terrestrial Radio Access (E-UTRA) Medium Access Control (MAC) protocol specification (Release 8)," Technical Specification, 3GPP TS 36.321 V8.0.0, Dec. 2007.
Ericsson, "Addressing MAC Control Elements," Tdoc R2-074063, Agenda Item: 5.1.1.2, 3GPP TSG-RAN WG2 #59bis, Shanghai, China, Oct. 8-12, 2007.
International Search Report, dated Mar. 3, 2009, for International Application No. PCT/JP2009/000370.
Panasonic, "Report of Handover Complete transmission discussion," R2-075433, Agenda Item: 4.4.3, 3GPP TSG RAN WG2 #60, Jeju, Korea, Nov. 5-9, 2007.
Samsung, "Msg3 encoding," Tdoc R2-R2-080162, Agenda Item: 4.3.1, 3GPP TSG-RAN2 Meeting #60b, Sevilla, Spain, Jan. 14-18, 2007.
SG Written Opinion dated Nov. 19, 2015 in SG application 2011054632.
3GPP TSG RAN2#60bis, R2-080009, T-Mobile, NTT DoCo Mo, Procedures in E-UTRAN to support "CS fallback", Seville, Spain, Jan. 14-18, 2008.
Notice of Allowance dated Mar. 14, 2017 in U.S. Appl. No. 14/843,319.
Advisory Action dated Jan. 9, 2017 in U.S. Appl. No. 14/843,319.
Final Office Action dated Sep. 29, 2016 in U.S. Appl. No. 14/843,319.
Office Action dated Jun. 10, 2016 in U.S. Appl. No. 14/843,319.
Notice of Allowance dated Jun. 9, 2015 in U.S. Appl. No. 13/722,742.
Final Office Action dated Feb. 3, 2015 in U.S. Appl. No. 13/722,742.
Office Action dated Oct. 24, 2014 in U.S. Appl. No. 13/722,742.
Notice of Allowance dated Feb. 12, 2013 in U.S. Appl. No. 12/865,674.
Notice of Allowance dated Oct. 9, 2012 in U.S. Appl. No. 12/865,674.
Office Action dated Mar. 7, 2012 in U.S. Appl. No. 12/865,674.
KR Notice of Preliminary Rejection and English translation thereof dated Nov. 21, 2017 in KR application 10-2017-7026553.
IN Examination Report dated Oct. 4, 2017 in IN application 4675/CHENP/2010.
EP Communication pursuant to Article 94(3) EPC dated Feb. 28, 2018 in EP Application 09705415.9.
Chinese Office Action and English translation thereof dated Feb. 27, 2018 in CN application 201510504624.1.
Korean Notice of Preliminary Rejection and English translation thereof dated Oct. 26, 2018 in KR application 10-2018-7024568.
Chinese Office Action and English translation thereof dated Nov. 2, 2018 in CN application 201510504624.1.

* cited by examiner

PRIOR ART

PRIOR ART

FIG.18

| 000 | RRC message is higher than priority1 |
| 001 | RRC message is between priority 1 and 2 |
| 010 | RRC message is between priority 2 and 3 |
| ... | |
| 111 | RRC message is lower than priority N |

(a) example of boundary info in case of 3bits

| 1. C-RNTI |
| 2. BSR |
| 3. CQI |
| ... |
| N. xxx |

(a) example of MAC control elements priority table

(a) RRC Connection Request

| Message type(=10) | Reserve | Establishment cause | Oct 1 |
| --- | --- | --- | --- |
| S-TMSI ||| Oct 2 |
| S-TMSI ||| Oct 3 |
| S-TMSI ||| Oct 4 |
| S-TMSI ||| Oct 5 |
| S-TMSI ||| Oct 6 |

(b) RRC Connection Re-establishment

| Message type(=11) | Reserve | Old Cell ID | Oct 1 |
| --- | --- | --- | --- |
| Old Cell ID ||| Oct 2 |
| C-RNTI ||| Oct 3 |
| C-RNTI ||| Oct 4 |
| MAC-I ||| Oct 5 |
| MAC-I ||| Oct 6 |

(c) Only C-RNTI

| E (=0) | R (=0) | R (=0) | LCID (for C-RNTI+Padding) | Oct 1 |
| --- | --- | --- | --- | --- |
| C-RNTI |||| Oct 2 |
| C-RNTI |||| Oct 3 |
| Padding (24bits) |||| Oct 4 |
|  |||| Oct 5 |
|  |||| Oct 6 |

(d) C-RNTI + BSR e.g. for UL data resuming and handover (if BSR is prioritized)

| E (=0) | R (=0) | R (=0) | LCID (for C-RNTI+BSR) || Oct 1 |
| --- | --- | --- | --- | --- | --- |
| C-RNTI ||||| Oct 2 |
| C-RNTI ||||| Oct 3 |
| Buffer Size #1 |||| Buffer Size #2 | Oct 4 |
| Buffer Size #2 ||| Buffer Size #3 || Oct 5 |
| Buffer Size #3 | Buffer Size #4 |||| Oct 6 |

BSR brace covers Oct 4–6.

(e) C-RNTI + DCCH e.g. for UL data resuming and handover (if DCCH (i.e. SRB) is prioritized)

| E (=0) | R (=0) | R (=0) | LCID (for C-RNTI+DCCH) | Oct 1 |
| --- | --- | --- | --- | --- |
| C-RNTI |||| Oct 2 |
| C-RNTI |||| Oct 3 |
| DCCH (24bits) |||| Oct 4 |
|  |||| Oct 5 |
|  |||| Oct 6 |

CQI brace covers Oct 4–6.

(f) C-RNTI + CQI e.g. for DL data resuming

| E (=0) | R (=0) | R (=0) | LCID (for C-RNTI+CQI) | Oct 1 |
| --- | --- | --- | --- | --- |
| C-RNTI |||| Oct 2 |
| C-RNTI |||| Oct 3 |
| CQI (14bit?) + padding (10bit?) |||| Oct 4 |
|  |||| Oct 5 |
|  |||| Oct 6 |

FIG.30

| index | LCID value |
|---|---|
| 00000-yyyyy | Identity of the logical channel |
| yyyyy-10111 | reserved |
| 11000 | C-RNTI |
| 11001 | C-RNTI + BSR |
| 11010 | C-RNTI + high priority DCCH |
| 11011 | C-RNTI + low priority DCCH |
| 11100 | C-RNTI + CQI |
| 11101 | Short buffer status report |
| 11110 | Long buffer status report |
| 11111 | Padding |

FIG.31
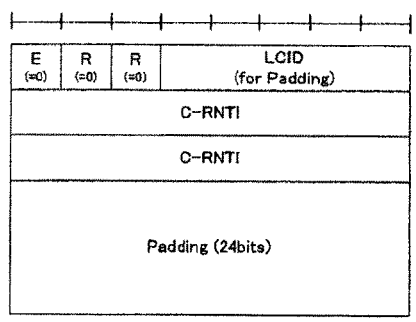
(a) Only C-RNTI
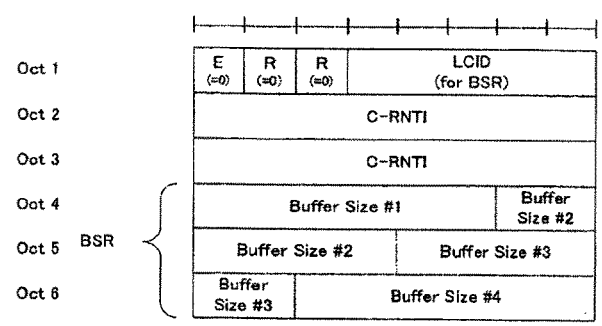
(b) C-RNTI + BSR e.g. for UL data resuming and handover (if BSR is prioritized)
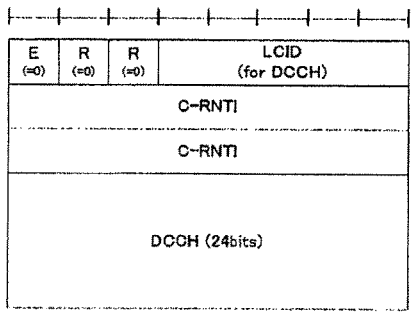
(c) C-RNTI + DCCH e.g. for UL data resuming and handover (if DCCH (i.e. SRB) is prioritized)
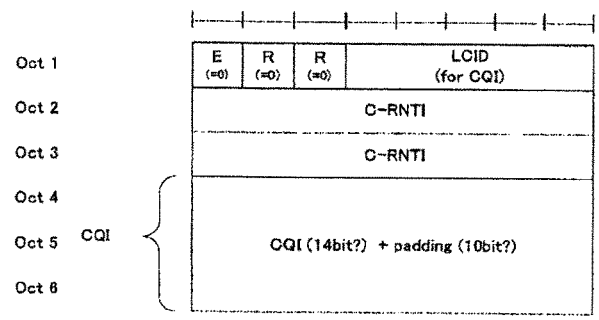
(d) C-RNTI + CQI e.g. for DL data resuming

COMMUNICATION TERMINAL AND METHOD WITH PRIORITIZED CONTROL INFORMATION

This application is a continuation of U.S. patent application Ser. No. 14/843,319 filed Sep. 2, 2015, now U.S. Pat. No. 9,713,162, which is a continuation of U.S. patent application Ser. No. 13/722,742 filed Dec. 20, 2012, now U.S. Pat. No. 9,161,368, which is a continuation of U.S. patent application Ser. No. 12/865,674 filed Jul. 30, 2010, now U.S. Pat. No. 8,396,081, which is a national stage of PCT/JP2009/000370 having international filing date Jan. 30, 2009, which claims priority of JP 2008-023171 filed Feb. 1, 2008, all of which are incorporated herein by reference.

TECHNICAL FIELD

The present invention relates to a communication terminal and base station for communicating in accordance with a predetermined procedure.

BACKGROUND ART

In E-UTRA/E-UTRAN standardized at present, time multiplex is adopted in both an up link (UL) from a terminal to a base station and a down link (DL) from the base station to the terminal. In up link, when the base station receives data from a plurality of terminals, if the reception timings of the data transmitted by the terminals shift, time multiplex cannot efficiently be executed. Thus, in a time multiplex system, the transmission timings of the terminals need to be adjusted so that the base station can receive the data transmitted by the terminals within a given delay.

This is called uplink synchronization (also called timing adjustment, timing alignment, etc.). The operation required for each terminal to achieve uplink synchronization is a RACH procedure (Random Access CHannel procedure). First, an outline of the RACH procedure will be described and then Message 3 transmission on which the invention focuses attention will be described.

[Outline of RACH Procedure]

In E-UTRA/E-UTRAN, the RACH procedure is used in various cases. The use reasons of the RACH procedure are specifically call connection (initial access), Handover complete, message transmission, UL/DL data transmission and reception resuming (UL/DL data resuming), and reconnection (radio link failure recovery).

The initial access is the case where the terminal performs call connection from an idle (RRC IDLE) state. Since the terminal is in IDLE state, uplink synchronization with the base station is not achieved.

The Handover complete transmission is the case where the terminal executes handover and the target base station is notified that the terminal moves to the target base station. The terminal has not connected to the target base station until then and thus here achieves synchronization with the target base station.

UL/DL data resuming is the case where the terminal performing intermittent reception (DRX) starts to transmit or receive UL or DL data. Since uplink synchronization of the terminal is got out after a while, it is necessary to again achieve synchronization.

Radio link failure recovery is the case where after it becomes impossible for the terminal to detect the connected cell, the terminal reconnects to a cell that is newly found (or that has been connected before). The situation resembles initial access.

There are two large types of RACH procedure. One is the case where the terminal selects RACH preamble transmitted to the base station on its own (non-dedicated RACH preamble case) and the other is the case where the terminal uses RACH preamble given from the base station (dedicated RACH preamble case).

The respective operations are shown in (a) and (b) of FIG. 1. The large difference is as follows: In the non-dedicated RACH preamble case, there is a possibility that a plurality of terminals may use the same RACH preamble at the same time and thus a message for checking the presence or absence of collision (Message 4: Contention resolution) is used; in the dedicated RACH preamble case, RACH preamble to be used is assigned by an assignment message (Message 0: RA preamble assignment).

To Message 1 and Message 2, the same applies to all cases, but in Message 3 and Message 4, different data is transmitted in response to each case. Only Handover complete transmission and DL data resuming can use dedicated RACH preamble, because the base station can perform the operation of assigning RACH preamble only in the two cases.

FIG. 2 shows the two procedures. Dedicated RACH preamble is not always used for Handover complete transmission or DL data resuming and non-dedicated RACH preamble can be used.

Another large difference between non-dedicated RACH preamble and dedicated RACH preamble is that when the base station receives dedicated RACH preamble, it can identify the terminal. Accordingly, work for checking which terminal sends RACH preamble in the later message becomes unnecessary.

In other words, in the non-dedicated RACH preamble case, the ID of the terminal needs to be contained in Message 3 to indicate which terminal accesses. As the ID of the terminal, if the terminal is active (RRC_CONNECTED), C-RNTI (Controlling Radio Network Temporary Id) used in cell units is used; if the terminal executes initial access, S-TMSI (S-Temporary Mobile Subscriber Id entity) used in Tracking area (unit of move management of IDLE terminal) or IMSI (International Mobile Subscriber Identity) of the ID unique to the terminal (corresponding to telephone number) is used. In radio link failure recovery, the cell identifier (cell ID) of the cell connected before radio link failure is caused to occur, C-RNTI in the cell, etc., is used.

[Message 3 Transmission]

Data that can be initially transmitted to the base station by the terminal is Message 3, and information for this is assigned in Message 2. However, it is known that the size of Message 3 is about 72 bits if the terminal is in a cell edge.

Thus, it is considered that it is difficult to transmit all information at one time. To show how Message 3 is configured, FIGS. 3, 4, and 5 show header configurations of MAC (Medium Access Control), RLC (Radio Link Control), and PDCP (Packet Data Convergence Protocol) respectively. FIG. 14 shows the configuration of protocol. An outline is described below:

(MAC)

Three types of MAC sub-headers are provided and the minimum sub-header is eight bits. What data is contained is indicated using LCID (Logical Channel ID), whether or not a MAC sub-header exists following a MAC sub-header is indicated in an E (Extention) field, and the data size is indicated in an L (Length) field).

MAC control element (MAC control information: as up link, C-RNTI, Buffer status report (BSR indicating the buffer status of the terminal), and CQI (Channel Quality Indicator indicating the channel status of the terminal) are also indicated in LCID. In this case, the size is predetermined and thus the L field is not required.

(RLC)

A 16-bit header is defined for RLC AM (acknowledge mode) and 16 bits (10-bit SN for long data) and eight bits (five-bit SN for short data) are defined for RLC UM (unacknowledged mode).

(PDCP)

Different headers are defined in SRB (signalling radio bearer: Bearer for carrying an RRC message of a control message) and data radio bearer (DRB, bearer for carrying data). For SRB, a 40-bit header becomes necessary.

The data radio bearer may be called user plane radio bearer (user radio bearer).

It is considered that Handover complete contains message type (indicating the type of message), transaction id (indicating response to which message), etc., as RRC message, and eight bits are assumed.

Non-patent Document 1: TS25.321: "Medium Access Control (MAC) protocol specification"

DISCLOSURE OF THE INVENTION

Problems to be Solved by the Invention

From the description given above, considering transmission of Handover complete, it is seen that if 72 bits only are assigned to the terminal for transmission, transmission needs to be executed twice as in Table 1. It is predetermined that BSR is transmitted after Handover is executed. In UMTS (Universal Mobile Telecommunication System), it is assumed that MAC control information (MAC control element in LTE) always has higher priority than SRB and DRB (refer to Non-patent Document 1).

Thus, it is assumed that the BSSR is sent earlier than Handover complete. In this case, transmission is executed three times as in Table 2 and further transmission of Handover complete is delayed.

TABLE 1

To transmit Handover complete only

|  | 1$^{st}$ segment | 2$^{nd}$ segment |
|---|---|---|
| RRC + PDCP | 24 bits | 24 bits |
| RLC | 16 bits | 16 bits |
| MAC | 8 bits<br>(LCID for RRC) | 8 bits<br>(LCID for RRC) |
| PHY (CRC) | 24 bits | 24 bits |
| Total | 72 bits | 72 bits |

TABLE 2

When BSR takes precedence over Handover complete

|  | 1$^{st}$ segment | 2$^{nd}$ segment | 3$^{rd}$ segment |
|---|---|---|---|
| RRC + PDCP | 0 bits | 24 bits | 24 bits |
| RLC | 0 bits | 16 bits | 16 bits |
| MAC | 48 bits<br>(LBSR + LCID +<br>24 bits padding<br>(LCID +<br>padding bits) | 8 bits<br>(LCID for RRC) | 8 bits<br>(LCID for RRC) |
| PHY (CRC) | 24 bits | 24 bits | 24 bits |
| Total | 72 bits | 72 bits | 72 bits |

As described above, if MAC control element (for example, BSR) takes priority, it is through that transmission of Handover complete is delayed. This has the following disadvantage:

(Path Switching Delay in Network)

As the base station receives Handover complete, it can reliably determine that the terminal moves. Thus, switching in the network (path switching from the former base station to a new base station) is performed at the timing at which Handover complete is received. If path switching is delayed, data, etc., not transferred from the former base station to the new base station is discarded.

FIG. 15 shows the relationship between the base station in the network and the entity of a core network. The core network entity continues to transmit data to the previous base station (source eNB) until path is switched to the core network entity.

There is no problem if the previous base station transfers data to a new base station; for example, it is thought that a packet is not transferred in real time service of VoIP, etc. To minimize this, shortening of path switching delay is demanded.

(Transmission Start Delay of Down Link)

As the base station receives Handover complete, it can reliably determine that the terminal moves, and can start down link data transmission. Thus, if reception of Handover complete is delayed, when there is data transferred from the former base station to a new base station, down link data transmission start is delayed.

Considering the description given above, it is undesirable that the MAC control element always takes precedence. Thus, the priority of the MAC control element needs to be controlled.

In view of the circumstances described above, it is an object of the invention to provide a communication terminal and a base station that can assign priority to MAC control information and can control what information is to be transmitted as desired.

Means for Solving the Problems

A communication terminal according to the present invention is a communication terminal for communicating with a base station in accordance with a predetermined procedure, the communication terminal comprising: a priority control section for defining the relationship between priority of MAC control information of priority assigned to MAC control information and priority assigned to DRB and SRB; and a transmission message generation section for controlling to transmit information having a high priority early in accordance with the relationship of priority defined by the priority control section.

According to the configuration described above, it is made possible to control what information is to be transmitted as desired in response to the priority of the MAC control information and the priority assigned to the DRB and the SRB. Therefore, appropriate control responsive to the description and the situation of communication service is made possible. For example, when VoIP is executed, if path switching needs to be performed rapidly, it is considered that the SRB has a higher priority than the BSR. Conversely, if path switching need not be performed rapidly and the buffer state of the terminal is to be understood rapidly, the BSR can have a higher priority than the SRB.

The communication terminal of the present invention may comprise a reception section for receiving the priority of the MAC control information transmitted from the base station.

In the communication terminal of the present invention, the MAC control information includes C-RNTI, BSR, and CQI, and the transmission message generation section transmits information having a high priority early in accordance with priorities of the DRB, the SRB, the C-RNTI, the BSR, and the CQI.

According to the configurations described above, for example, if the C-RNTI is set to priority 1 and the BSR and the CQI is set to priority 3, when the priority of the SRB is 2, only the C-RNTI can have a higher priority than the SRB and it is made possible to control what information is to be transmitted as desired.

The communication terminal of the present invention comprises a priority table section for holding information of the priority of the MAC control information, and the reception section receives boundary information indicating boundary of the priority of the MAC control information, and the priority control section references the boundary information to define the relationship between the priority of the MAC control information and the priority assigned to the DRB and the SRB.

According to the configuration described above, the boundary information of the priority of the MAC control information can be set using a small number of bits, so that an increase in overhead of signaling can be suppressed.

In the communication terminal of the present invention, the priority control section specifies the priority of the MAC control information in response to a use reason of a RACH procedure.

According to the configuration described above, the priority of the MAC control information is specified in response to the use reason of the RACH procedure, whereby the transmission operation can be changed for each RACH procedure.

In the communication terminal of the present invention, the reception section receives a threshold concerning the size of a message from the base station, and the priority control section references the threshold to define the relationship between the priority of the MAC control information and the priority assigned to the DRB and the SRB.

According to the configuration described above, if the message set to be transmitted early is large, the MAC control information is transmitted early and overhead accompanying transmission of a large message can be decreased.

In the communication terminal of the present invention, the reception section receives information required for determining the priorities of the MAC control information and the SRB from the base station, and the priority control section references the information to determine the priorities of the SRB and the MAC control information.

According to the configuration described above, the priority can be set without a command from the network.

In the communication terminal of the present invention, the information required for determining the priorities of the MAC control information and the SRB contains information indicating whether or not service in which the packet loss increases because of path switching delay is received, information indicating whether or not handover is handover within the base station, and information indicating whether or not handover is handover between the base stations.

According to the configuration described above, the priorities of the SRB and the MAC control information can be determined without a command from the network based on whether or not VoIP is used and whether or not handover is handover in the base station or is handover between the base stations.

In the terminal of the present invention, an extension field indicating whether or not MAC sub-header follows is placed at the top in MAC sub-header and if a resource of 72 bits only of MAC sub-header is allocated, whether or not MAC header exists is indicated by the value of the extension field positioned in the beginning of MAC header.

According to the configuration described above, the terminal can notify the base station whether or not MAC header exists without using a new bit.

A base station according to the present invention is a base station for communicating with a communication terminal in accordance with a predetermined procedure, wherein priority is assigned to MAC control information and the priority of the MAC control information is transmitted to the communication terminal.

According to the configuration described above, priority is assigned to the MAC control information, so that it is made possible to control what information the terminal transmits as desired.

In the base station of the present invention, the priority of the MAC control information is previously determined and only information of boundary between MAC control information having a higher priority than SRB and MAC control information having a lower priority than the SRB is transmitted to the communication terminal.

According to the configuration described above, the boundary of the MAC control information can be set using a small number of bits, so that an increase in overhead of signaling can be suppressed.

In the base station of the present invention, the priority of the MAC control information responsive to a use reason of a RACH procedure is transmitted to the communication terminal.

According to the configuration described above, the priority of the MAC control information is specified in response to the use reason of the RACH procedure, whereby the operation of the terminal can be changed for each RACH procedure.

In the base station of the present invention, if the size of a message to be transmitted is greater than a predetermined size, the MAC control information takes precedence.

According to the configuration described above, if the message set to be transmitted early is large, the MAC control information is transmitted early and overhead accompanying transmission of a large message can be decreased.

In the base station of the invention, an extension field indicating whether or not MAC sub-header follows is placed at the top in MAC sub-header and if a resource of 72 bits only of MAC sub-header is allocated, whether or not MAC header exists is determined by the value of the extension field positioned in the beginning of MAC header.

According to the configuration described above, the base station can determine whether or not MAC header exists without using a new bit.

Advantageous Effects of the Invention

According to the communication terminal of the invention, a comparison is made between the priority of the MAC control information and the priority assigned to the DRB and the SRB, whereby it is made possible to control what information is to be transmitted as desired. According to the base station of the invention, priority is assigned to the MAC control information and the priority of the MAC control information is transmitted to the communication terminal, so that it is made possible to control what information the communication terminal transmits as desired.

BRIEF DESCRIPTION OF THE DRAWINGS

FIG. 18 shows an example of MAC control element priority table and an example of boundary information in Embodiment 2 of the invention.

FIG. 26 shows the configuration of a MAC sub-header according to conventional proposition 1.

FIG. 29 shows configuration examples of MAC header according to Embodiment 6 of the invention.

FIG. 30 shows a definition example of LCID according to Embodiment 6 of the invention.

FIG. 31 shows other configuration examples of MAC header according to Embodiment 6 of the invention.

DESCRIPTION OF REFERENCE NUMERALS AND SIGNS

| | |
|---|---|
| 701, 2201 | Reception section |
| 702, 1101 | Priority table section |
| 703, 1001, 1301, 1701, 2202 | Priority control section |
| 704, 1002, 1302, 2203 | Transmission message generation section |
| 705 | SRB generation section |
| 706 | DRG generation section |
| 707 | Buffer section |
| 708 | MAC information generation section |
| 709 | Transmission section |

BEST MODE FOR CARRYING OUT THE INVENTION

An example wherein the priority of transmission data is defined before execution of RACH procedure by a base station and a terminal will be described below: Embodiments described below can be applied to the non-dedicated RACH preamble case and the dedicated RACH preamble case in a similar manner.

Embodiment 1

SRB (signalling radio bearer: bearer for carrying an RRC message of a control message) and DRB (user plane radio bearer/data radio bearer: bearer for carrying data) have each a priority. As present SRB, high priority SRB (SRB2) for sending an RRC message having a high priority and low priority SRB (SRB1) having a priority as usual SRB exist for an RRC_CONNECTED terminal to communicate. Another SRB (SRB0) is defined for carrying an RRC message until a terminal moves to RRC_CONNECTED in initial access, Radio link failure recovery, etc. DRB is added in response to service used by the terminal; for example, DRB for VoIP, DRB for web browsing, DRB for transferring email, and the like are set.

Figure 16:
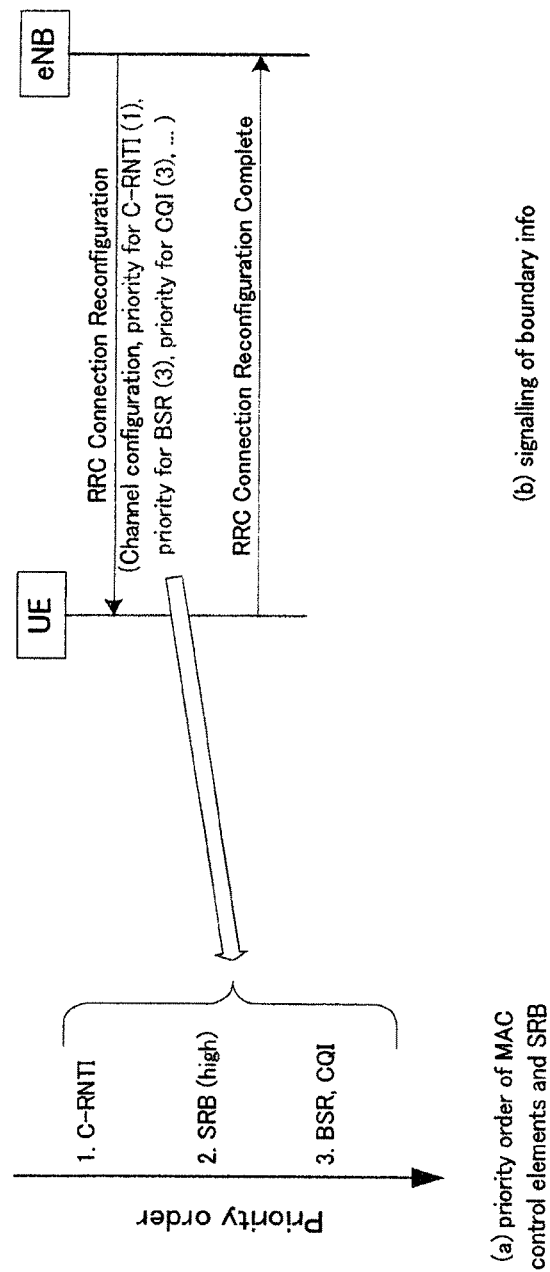
FIG. 16 shows an outline of setting priority for each MAC control element in Embodiment 1 of the invention.

Priority is set for each bearer so that the base station can control which bearer the terminal may transmit. Basically, SRB has a higher priority than DB. In DRB, a bearer for service involving strict requirement for a delay (time critical service) has a high priority. Thus, in the example, the following priority is considered:

High priority SRB>low priority SRB>DRB for VoIP>DRB for web browsing>DRB for email In the embodiment, priority is set for each MAC control element as like SRB and DRB. An outline is shown in FIG. 16. As shown in the figure, for example, if priority values are 1 to 8 and 1 is the highest, it is considered that C-RNTI considered to be the highest priority in the MAC control element is set to priority 1 and BSR, CQI, etc., considered to be next highest priority is set to priority 3.

If the priority of high priority SRB becomes 2, only C-RNTI takes precedence over high priority SRB. According to such operation, it is made possible to control what information the terminal is caused to transmit as desired.

Specifically, if the terminal uses VoIP and path switching needs to be made rapid, it is considered that the priority of high priority SRB is made higher than that of BSR. Conversely, if path switching need not be made rapid and the buffer state that the terminal has is to be grasped rapidly, the priority of BSR can be made higher than that of high priority SRB.

(Block Diagram)

Figure 17:
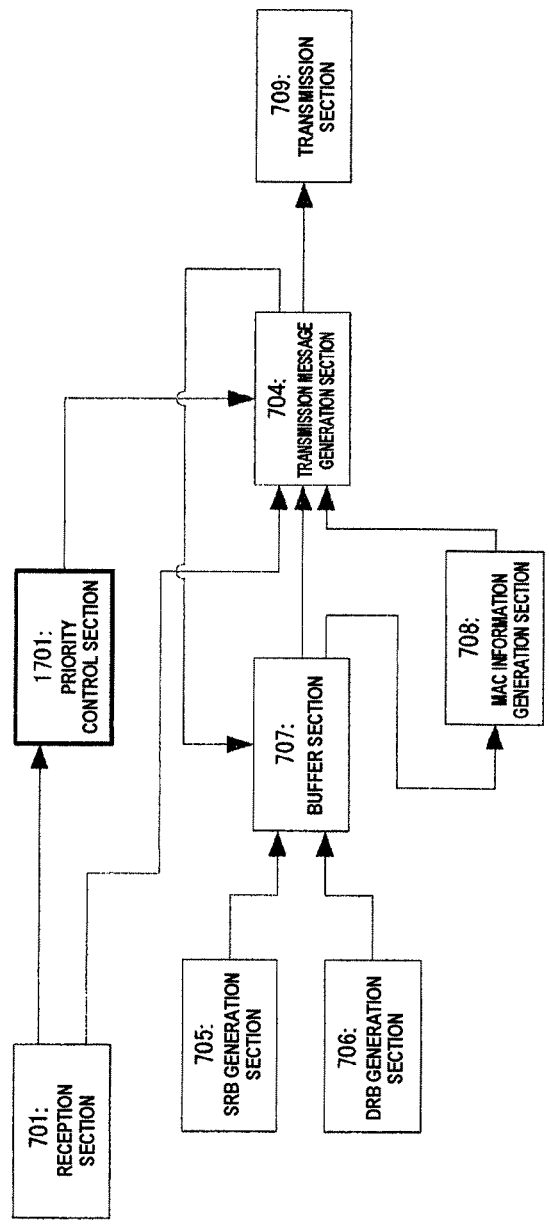
FIG. 17 is a block diagram of a terminal according to Embodiment 1 of the invention.

FIG. 17 is a block diagram of a terminal of the invention. The communication terminal shown in FIG. 17 includes a reception section 701, an SRB generation section 705, a DRB generation section 706, a priority control section 1701, a transmission message generation section 704, a buffer section 707, a MAC information generation section 708, and a transmission section 709. The main operation and the roles of the sections are as follows:

The reception section 701 receives a message from a base station. The reception section 701 receives the priority for each MAC control element and sends the priority to the priority control section 1701. The reception section 701 receives the message size transmitted by the terminal and sends the message size to the transmission message generation section 704. The SRB generation section 705 creates a message to be transmitted using SRB of an RRC message, a NAS message, etc. The DRB generation section 706 creates user plane data.

The priority control section 1701 receives the priority for each MAC control element from the reception section 701. The priority control section 1701 defines the priority relationship between MAC control element and SRB such as "C-RNTI>SRB>BSR>CQI>DRB" or "C-RNTI>high priority SRB>BSR>low priority SRB>CQI>DRB" according to the priority for each MAC control element and the priority assigned usually to DRB and SRB. The priority control section 1701 uses the result to control the transmission message generation section 704 so as to create a transmission message for transmitting high priority information early.

The transmission message generation section 704 creates a transmission message based on the priority information from the priority control section 1701 and the transmission message size from the reception section 701. The transmission message generation section 704 receives MAC control element from the MAC information generation section 708 described later, reports transmittable bearer and the amount to the buffer section 707, and receives information to be transmitted of SRB or DRB from the buffer section 707.

The buffer section 707 holds information from the SRB generation section 705 and the DRB generation section 706 and transmits the information to the transmission message generation section 704 in response to a command of the transmission message generation section 704.

The MAC information generation section 708 generates MAC control element and reports the MAC control element to the transmission message generation section 704. Specifically, when C-RNTI needs to be transmitted, the MAC information generation section 708 passes C-RNTI to the transmission message generation section 704. When BSR needs to be transmitted, the MAC information generation section 708 generates and transmits BSR from information of the buffer section 707. The transmission section 709 has a role of transmitting a message created by the transmission message generation section 704 to the base station.

As described above, according to the embodiment, the priority can be set as desired for each MAC control element, so that data to be transmitted preferentially to the base station in Message 3 of RACH procedure can be appropriately controlled in response to the description and the situation of communication service.

Embodiment 2

Figure 6:
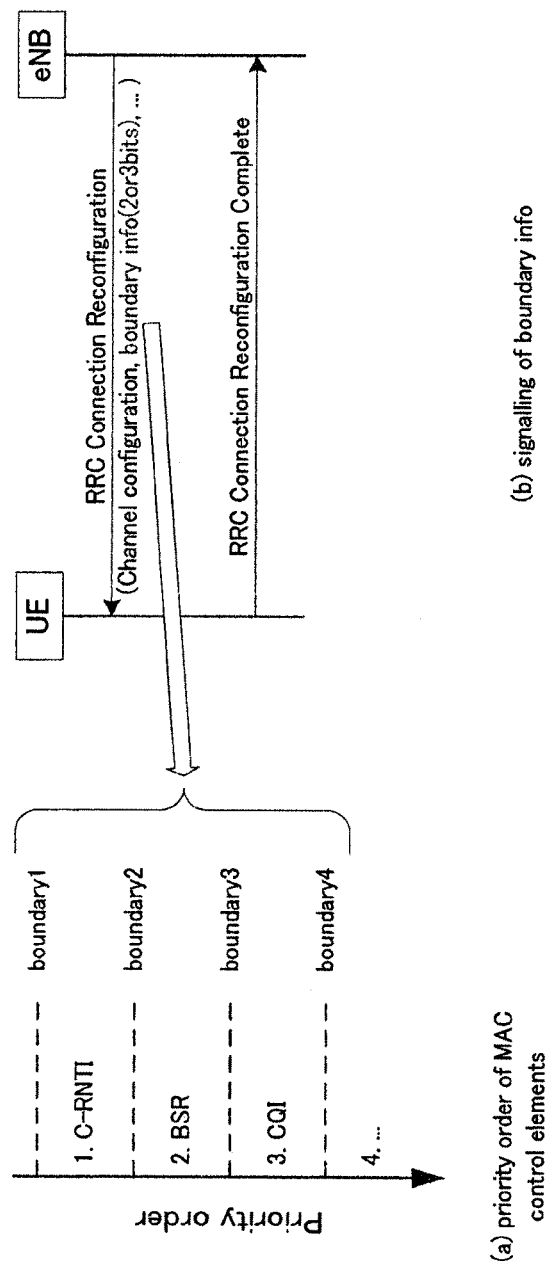
FIG. 6 shows the concept of Embodiment 2 of the invention.
Figure 7:
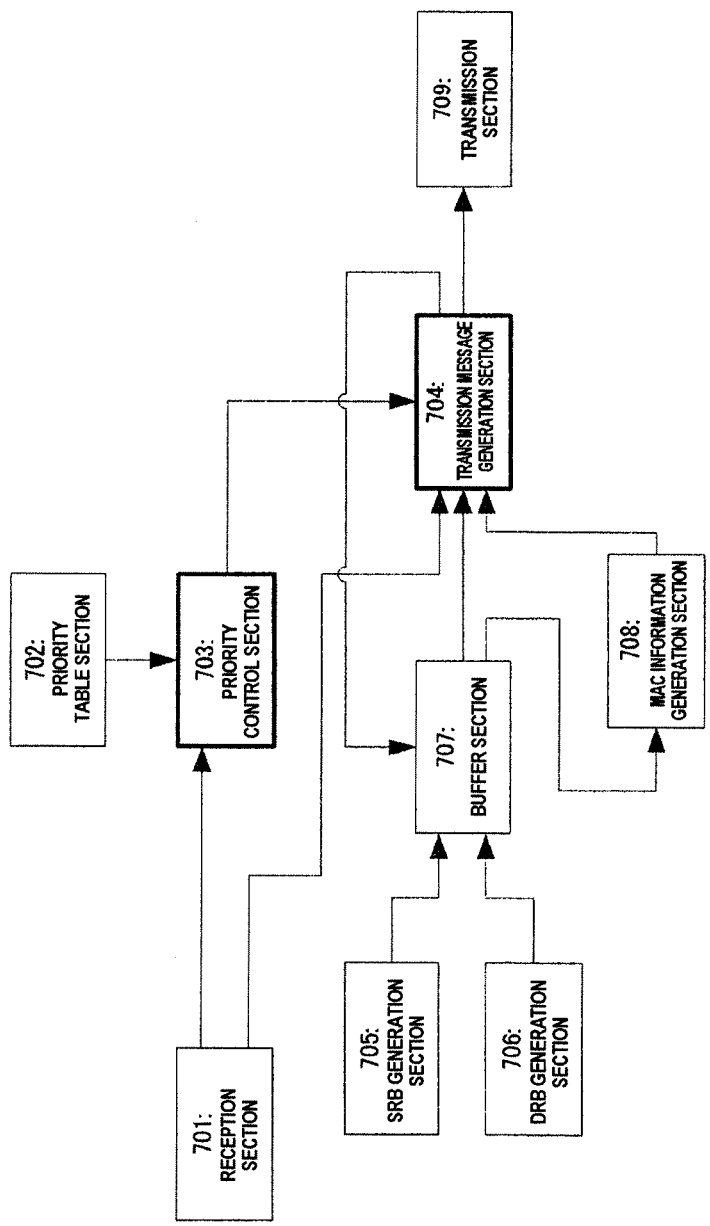
FIG. 7 is a block diagram of a terminal according to Embodiment 2 of the invention.
Figure 8:
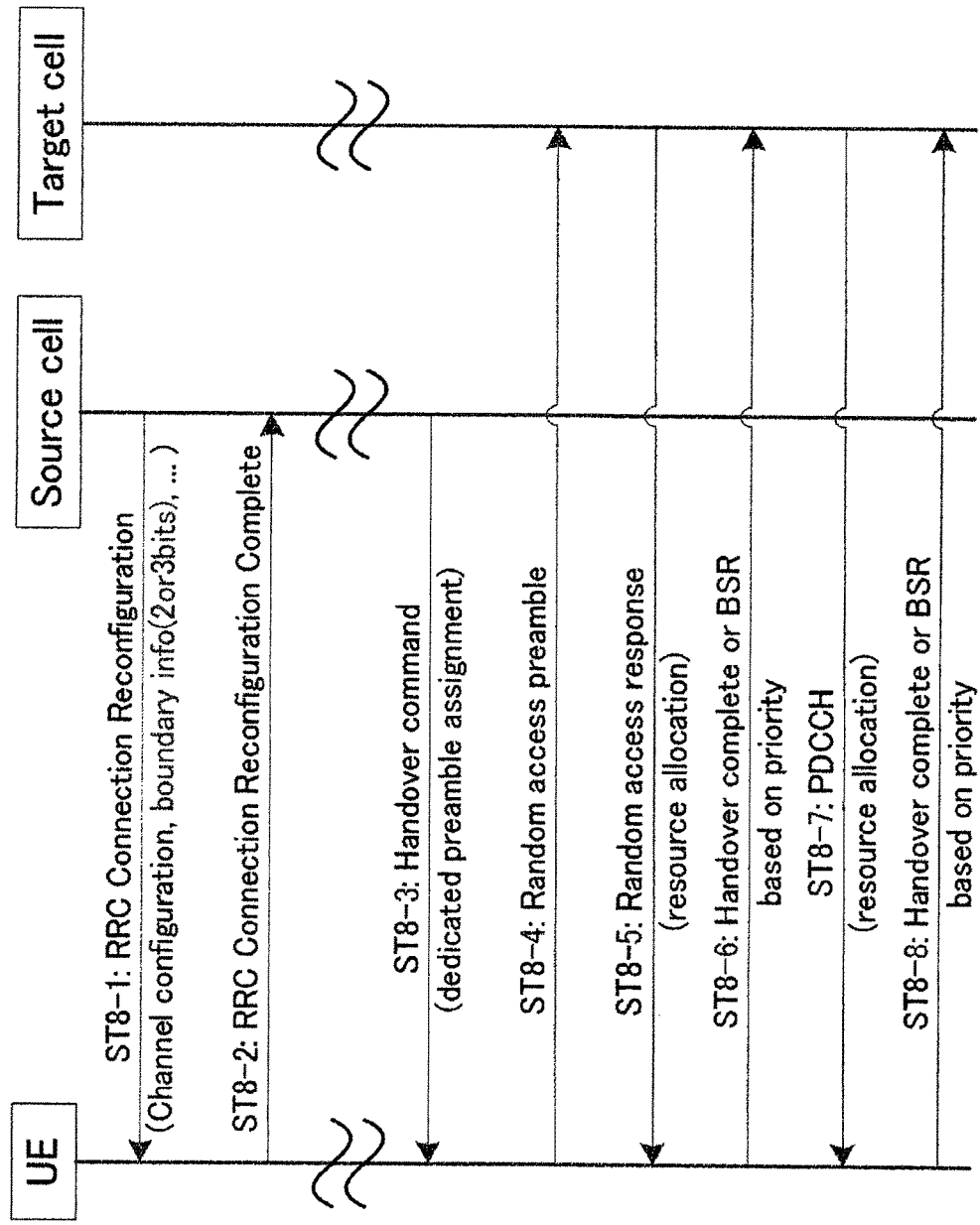
FIG. 8 shows a specific example of a procedure according to Embodiment 2 of the invention.

FIG. 6 shows the concept of Embodiment 2, FIG. 7 is a block diagram of a terminal, and FIG. 8 shows a specific example of a procedure of the operation.

In Embodiment 1, the priority can be set as desired for each MAC control element. However, the system of Embodiment 1 involves a problem in that the overhead of signalling for the base station to set priority for the terminal increases. In Embodiment 2, priority in MAC control element is previously determined and only the boundary between the MAC control element having a high priority for SRB and the MAC control element having a low priority is set, whereby the problem is solved. FIG. 6 shows an outline.

As by (a) in FIG. 6, priority is determined in MAC control elements. It is considered that the priority is stipulated in the specification (spec) of standardization, etc.; it may be transmitted in report information, etc., or may be sent in a discrete RRC message. In the embodiment, an example wherein the priority is stipulated in the specification (spec) of standardization, etc., will be described. The boundary between the MAC control element having a higher priority than SRB and the MAC control element having a lower priority than SRB is set. Specifically, any of boundaries 1 to 4 in the example by (a) in FIG. 6 is specified. A signalling example at this time is shown by (b) in FIG. 6. The procedure shown by (b) in FIG. 6 is executed before Message 1 shown by (a) in FIG. 1.

Specifically, if boundary 2 is specified, the priority order becomes as follows:

C-RNTI>SRB>BSR>CQI>DRB

Although one priority is under SRB, it is also considered that the priority of the MAC control element is compared with high priority SRB for setting as follows:

C-RNTI>high priority SRB>BSR>low priority SRB>CQI>DRB (Block Diagram)

FIG. 7 is a block diagram of the terminal of the embodiment. The terminal shown in FIG. 7 includes a priority control section 703 and a priority table section 702 in place of the priority control section 1701 of the terminal shown in FIG. 17. Difference of the main operation and the role of each section from those of Embodiment 1 will be described.

In Embodiment 2, a reception section 701 has a role of receiving boundary information described above and reports the boundary information to the priority control section 703 in addition to the role described in Embodiment 1.

The priority table section 702 has a role of holding information of priority in MAC control elements shown by (a) in FIG. 6 and reporting the information to the priority control section 703.

The priority control section 703 defines the priority relationship between MAC control element and SRB such as "C-RNTI>SRB>BSR>CQI>DRB" or "C-RNTI>high priority SRB>BSR>low priority SRB>CQI>DRB" according to the boundary information from the reception section 701 and the priority table section information from the priority table section 702. The priority control section 703 uses the result to control the transmission message generation section 704 so as to transmit high priority information early.

DETAILED DESCRIPTION

The operation of the invention will be described with FIGS. 7 and 8. FIG. 8 shows a specific example of procedure of handover transmission.

As shown in FIG. 8, first, boundary information is reported from a base station (Source cell) to a terminal (UE) (ST8-1: RRC CONNECTION RECONFIGURATION message). The boundary information is received by the reception section 701 and is passed to the priority control section 703. The priority control section 703 obtains information of the priority of MAC control element from two pieces of information of the boundary information received in ST8-1 and table indicating the priority in MAC control elements described by (a) in FIG. 6 held in the priority table section 702. The priority control section 703 sends the information to the transmission message generation section 704.

Next, a response message to ST8-1 created in the transmission message generation section 704 is transmitted from a transmission section 709 of the terminal to the base station (ST8-2: RRC CONNECTION RECONFIGURATION COMPLETE message).

The base station reports execution of Handover to the terminal (ST8-3: Handover Command message). The terminal executes handover in response to it. The processing is general operation and does not directly relate to the invention and thus will not be described.

Handover Command and Handover Complete message are generic terms of a Handover command message for the terminal by the base station and a message for the terminal to indicate completion of Handover for the base station respectively. In E-UTRA/E-UTRAN, RRC CONNECTION RECONFIGURATION message and RRC CONNECTION RECONFIGURATION COMPLETE message are used.

ST8-4: Random Access preamble and ST8-5: Random Access response executed after ST8-3 are usual RACH procedure and will not be described in detail. After ST8-5, the transmission message generation section 704 determines the message size in Message 3 based on resource allocation information received in ST8-5. The message size is sent from the reception section 701 to the transmission message generation section 704.

If both Handover complete and BSR are to be sent and cannot be contained in one message, which takes precedence is determined depending on the priority. That is, if BSR>SRB, BSR takes precedence over SRB and if BSR<SRB, Handover complete takes precedence. Thus, the description sent in ST8-6, ST8-8 becomes Handover complete or BSR depending on the priority determined by the priority control section 703.

In FIGS. 18, (a) and (b) show an example of a MAC control element priority table and an example of boundary information respectively. Thus, the MAC control element priority is provided as the table and the RRC message priority (it may be only high priority SRB, both high priority SRB and low priority SRB, or only low priority SRB) is reported in the boundary information and thus the description to be transmitted can be controlled.

Next, how the base station determines the boundary information will be described. As described above, transmission delay of Handover Complete message causes delay of path switching in the network. Real time service such as VoIP not transferring data from the source base station to the Handover target base station as described above is largely affected by the delay of path switching.

Thus, processing in which only a terminal executing VoIP takes precedence in transmission of Handover Complete is considered. Effectiveness of terminal information transferred between base stations as information for switching a path is also considered. At the time of Handover, terminal information is transferred between the base stations.

At this time, information of the reception quality of the terminal, the buffer state of the terminal, etc., is also transferred. If the move speed of the terminal is not so high and the reception quality of the terminal is sufficient as information transferred between the base stations, it is considered that the priority of CQI is lowered; conversely, if the move speed of the terminal is high, it is considered that the priority of CQI is raised.

Service in which the buffer state easily varies and a service in which the buffer state hardly varies are considered. For example, in service of VoIP, etc., the buffer state does not so much vary. In contrast, to execute upload, it is considered that the buffer state largely varies.

Thus, it is considered that if only service in which the buffer state hardly varies is executed, the priority of BSR is lowered and if service in which the buffer state easily varies is executed, the priority of BSR is raised. Such operation makes it possible to control information to be transmitted by the terminal.

In the embodiment, one boundary is set for MAC control element by way of example, but the number of boundaries to be set can also be increased. Specifically, it is also considered that the boundary for high priority SRB (for example, boundary 2 by (a) in FIG. 6) and the boundary for low priority SRB (for example, boundary 3 by (a) in FIG. 6) are set and priority is set such as "C-RNTI>high priority SRB>BSR>CQI>low priority SRB>DRB."

In the embodiment, priority of MAC control element can be set only for SRB. Alternatively, it can also be set for DRB having the highest priority. That is, processing such as "C-RNTI>SRB>BSR>high priority DRB>CQI>other DRB" can be realized by providing a plurality of pieces of boundary information.

In the embodiment, the transmission example of Handover complete is shown, but it can also be applied to other cases. As a specific example, UL data resuming can be named. UL data resuming is operation in the case of occurrence of data transmitted during DRX by the terminal.

Specifically, it is considered that the measurement result indicating the reception state of the terminal (Measurement report as RRC message) is transmitted and a service request for addition of a new service (service request, etc., as NAS message) is sent. The Measurement report indicating the measurement result is required for execution of Handover and thus is a message having a high priority.

Figure 19:
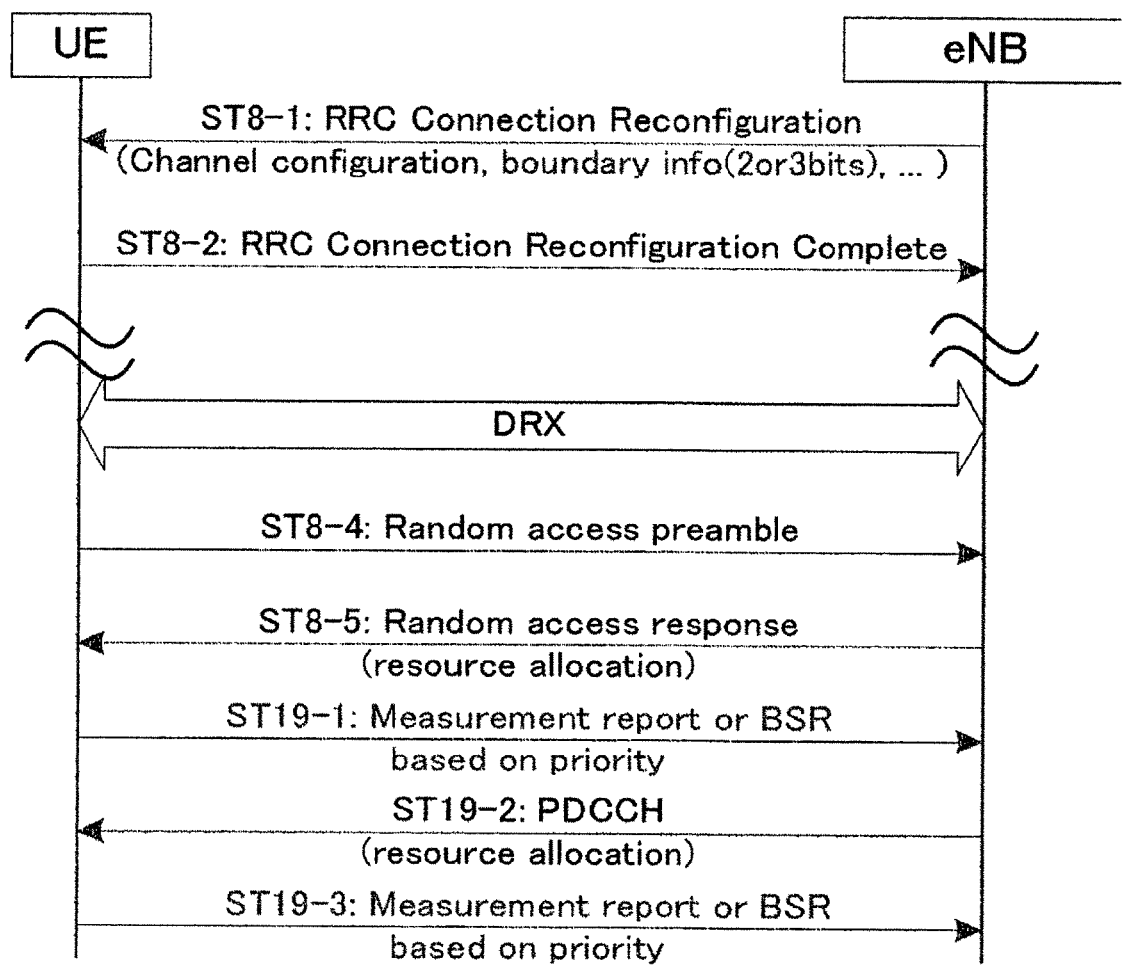
FIG. 19 shows operation when a base station considers the speed of a terminal in Embodiment 2 of the invention.

Thus, if the move speed of the terminal is high, the message must be sent early. As described above, as the base station considers the move speed of the terminal, at the time, whether occurred data is to be sent or BSR or CQI takes precedence can be determined according to the processing shown in the embodiment. The operation at the time is shown in FIG. 19.

The priority of MAC control element can also be made as the order of LCID. As described above, each MAC control element is indicated by LCID. For example, BSR is 11100, CQI is 11101, etc. The order of LCID is defined so as to become the priority order, whereby the need for specially providing a priority table in the terminal is eliminated.

In the embodiment, notification of Handover Command and Boundary information is separate messages as shown in FIG. 8, but Boundary information can be reported or changed in Handover Command.

In the embodiment, the operation of setting so as to raise the priority of RRC message when the terminal executes VoIP and Handover complete should take precedence, etc., is shown. However, there is a problem in that the situation varies in Handover between cells in the same base station.

The reason is that the need for transmitting Handover complete early is eliminated because switching of the base station does not occur. To realize this, the operation of temporarily changing priority is considered.

Figure 20:
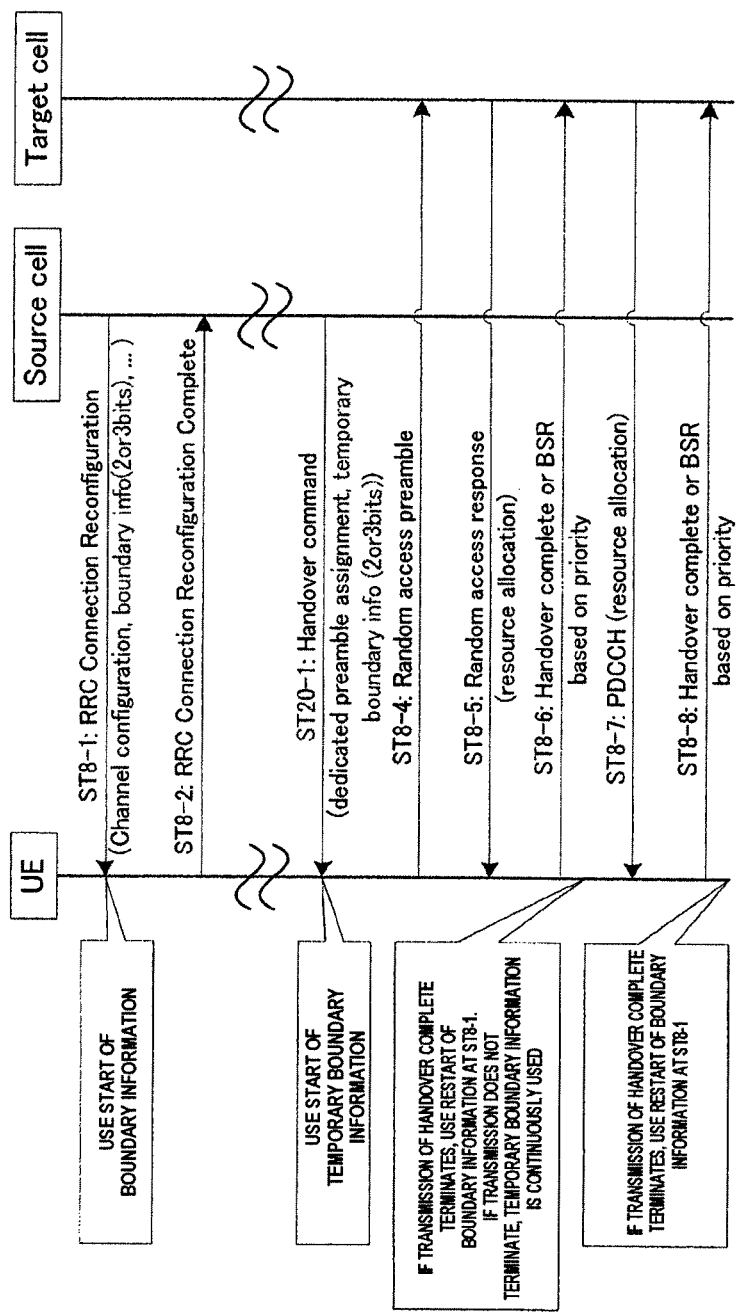
FIG. 20 shows operation of temporarily changing priority in Embodiment 2 of the invention.

FIG. 20 shows the operation in this case. The operation differs largely from the operation in FIG. 8 in that temporary priority is assigned at ST20-1 corresponding to ST8-3. The temporary priority is applied only to response to ST20-1: Handover Command transmitted by the base station and is applied only to Handover Complete.

In the description of the invention, attention is focused on Message 3 of the RACH procedure, but the embodiment can be applied to all usual uplink transmission.

Figure 24:
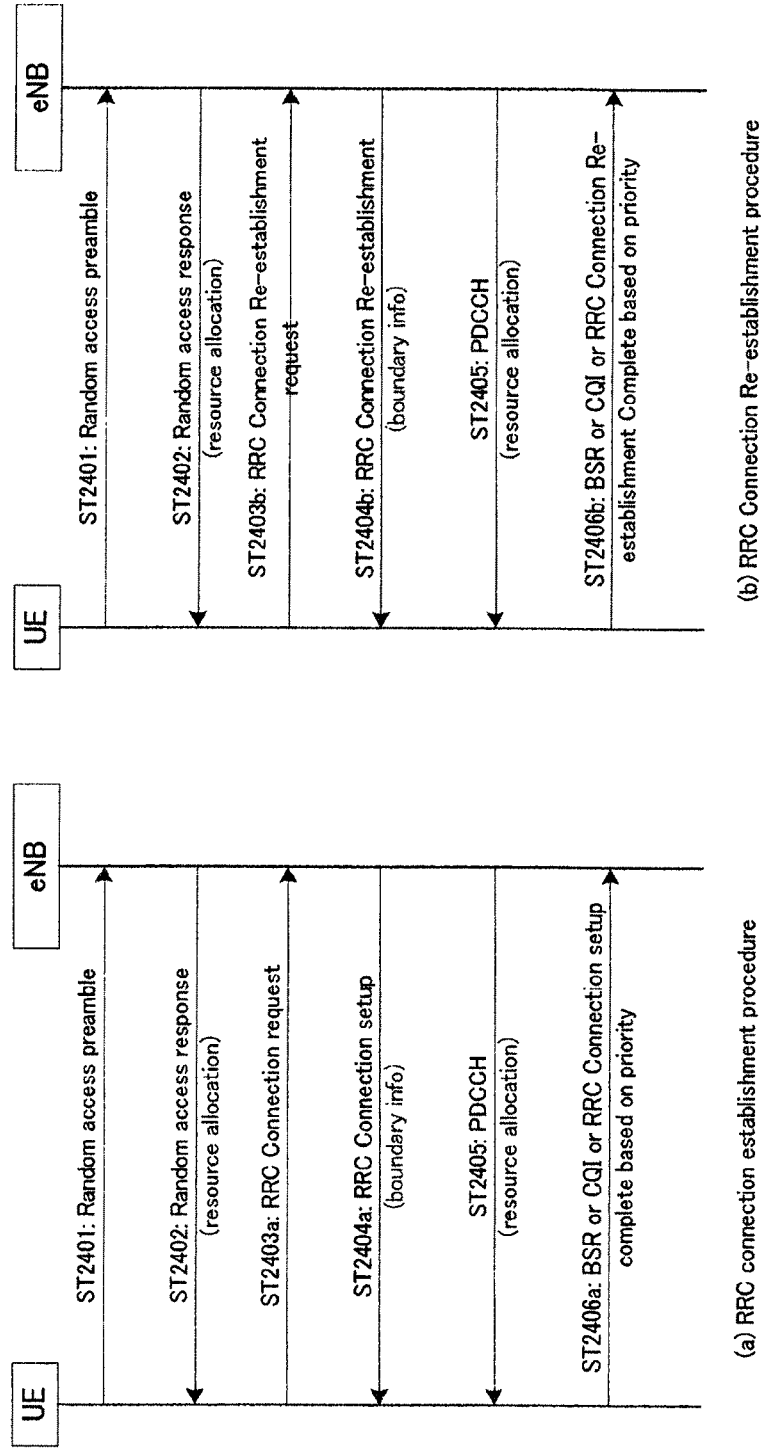
FIG. 24 shows a flow when the terminal executes initial access (call connection), Radio link failure recovery (reconnection) in Embodiment 2 of the invention.

As a typical example when the embodiment is used for all usual uplink transmission, it is considered that the terminal executes initial access (call connection), Radio link failure recovery (reconnection). A flow is shown in FIG. 24. When the terminal executes call connection or reconnection, the network does not precisely know the reception state of the terminal, etc. Thus, information of CQI, etc., is required.

On the other hand, however, information sent to Core network is entered in the signal sent by the terminal at ST2406a and if it is not sent, finally call connection does not terminate. On the other hand, ST2406b is mainly used for acknowledgment response only.

Thus, boundary information given at ST2404a, ST2404b makes possible the operation such that SRB (namely, RRC CONNECTION SETUP COMPLETE) takes precedence at the time of initial access. Accordingly, the problem in that delay of call connection increases because of transmission of MAC control element can be solved.

Embodiment 3

Figure 9:
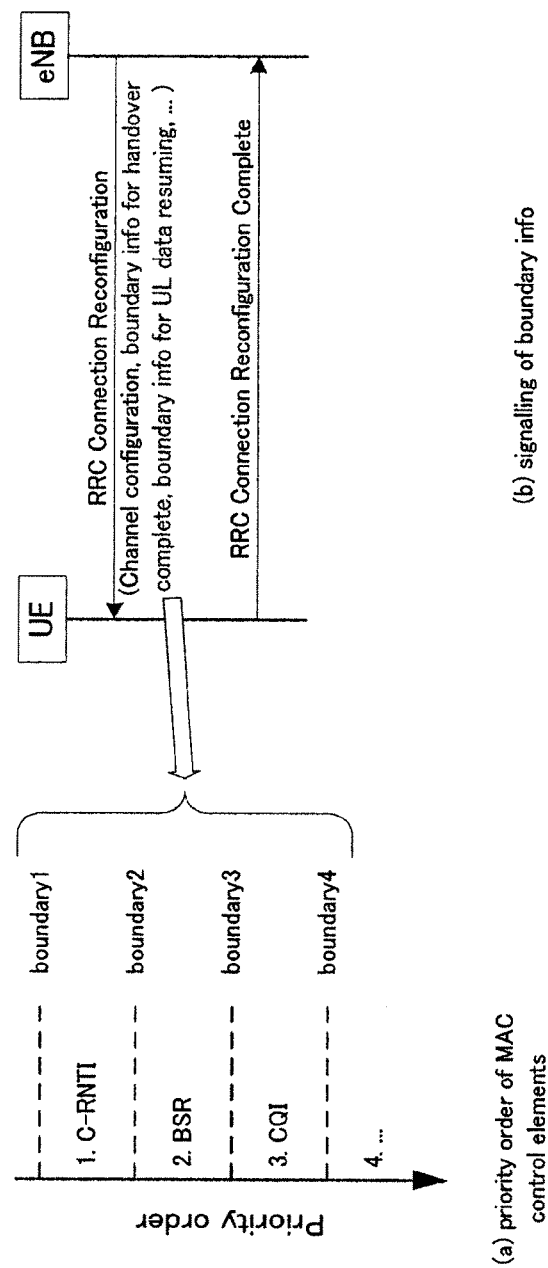
FIG. 9 shows the concept of Embodiment 3 of the invention.
Figure 10:
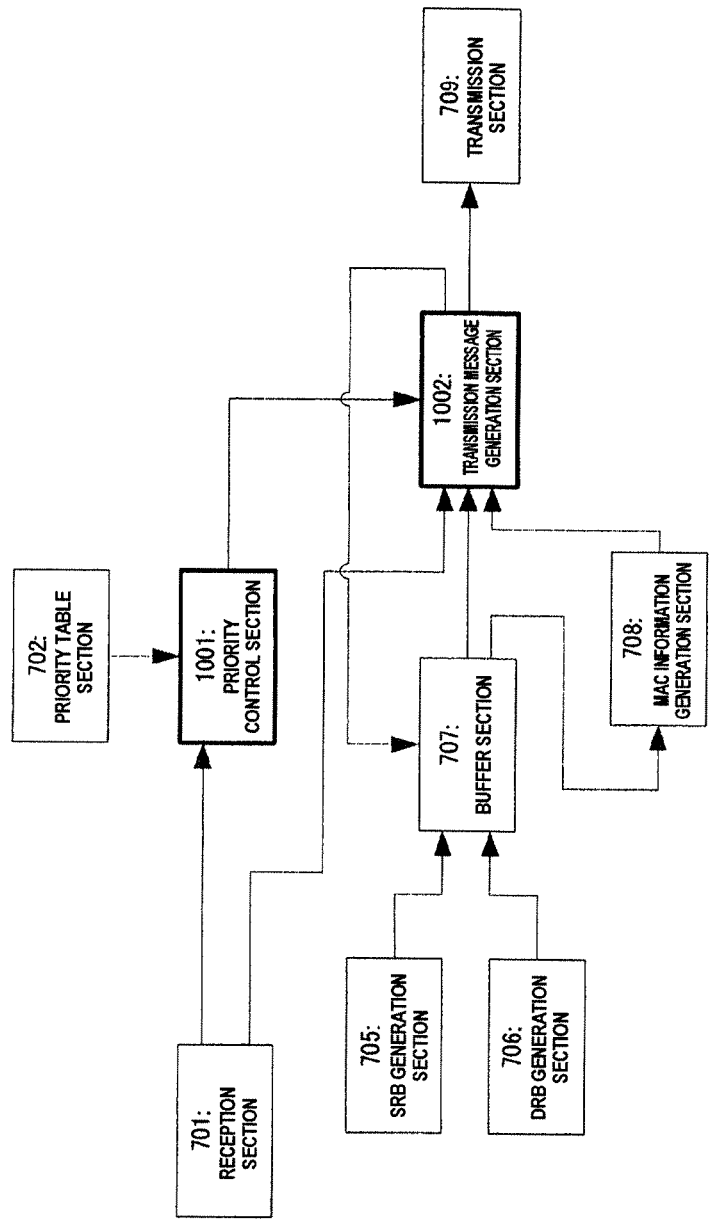
FIG. 10 is a block diagram of a terminal according to Embodiment 3 of the invention.

FIG. 9 shows the concept of Embodiment 3 and FIG. 10 is a block diagram of a terminal. Embodiment 2 shows the case where the same priority setting is used for all cases using the RACH procedure. However, since necessary information slightly varies for the use reason of RACH procedure, it is considered that the priority is determined for each reason executing the RACH procedure. Embodiment 3 makes it possible to control transmission data more appropriately in response to the use reason of the RACH procedure. A priority determination example for each reason executing the RACH procedure is shown below:

(Transmission of Handover Complete)

It is considered that if BSR is not so much changed, BSR reported from the source base station to the target base station can be used. Thus, it is considered that Handover complete (namely, SRB) takes precedence.

(Uplink Transmission Start Delay)

To know how much information the terminal has, BSR becomes necessary.

Thus, it is considered that BSR takes precedence over SRB.

(Downlink Transmission Start Delay)

To execute downlink transmission, it is considered that CQI is required. Thus, it is considered that CQI takes precedence.

In FIG. 9, (b) shows the information indication operation to realize this. Boundary information is thus determined for each use reason of the RACH procedure, so that it is made possible to change the operation for each RACH procedure.

(Block Diagram)

FIG. 10 is a block diagram of the terminal of the embodiment. The terminal shown in FIG. 10 includes a priority control section 1001 and a transmission message generation section 1002 in place of the priority control section 703 and the transmission message generation section 704 of the terminal shown in FIG. 7. Only the difference will be described. The priority control section 1001 can have different priority setting for each reason of RACH procedure and reports it to the transmission message generation section 1002. The transmission message generation section 1002 generates a transmission message using different priority setting for each reason of the RACH procedure.

Figure 11:
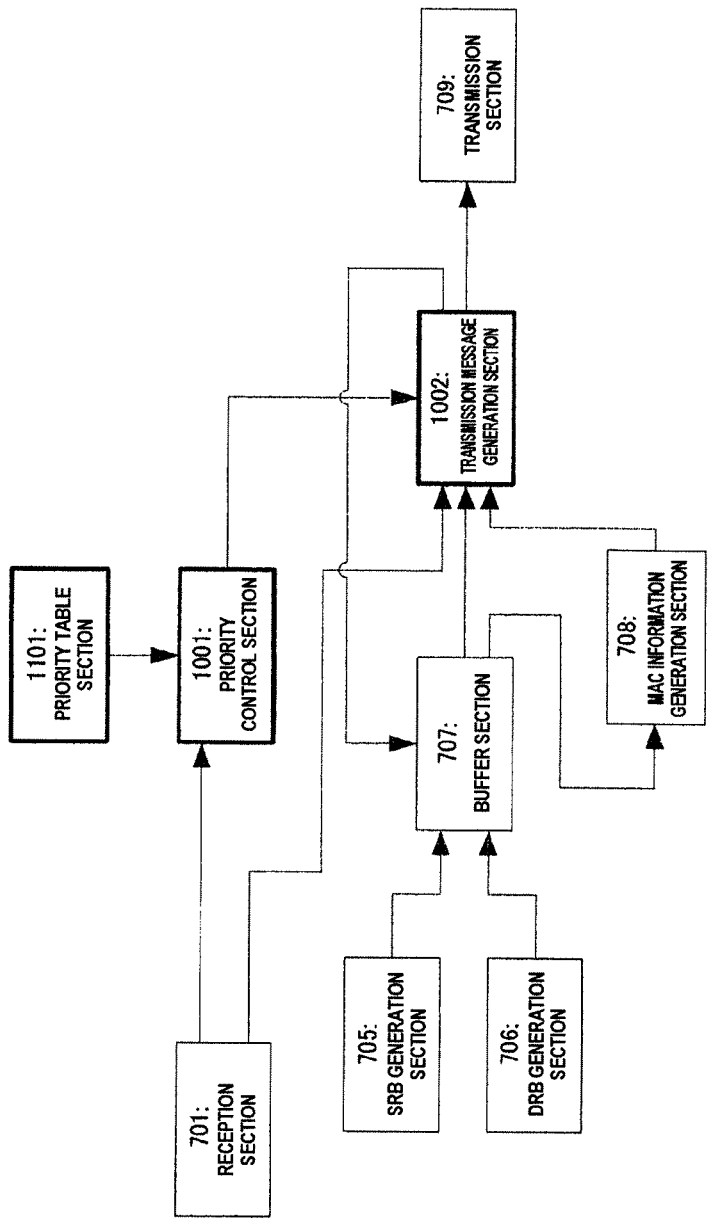
FIG. 11 describes change of priority of MAC control element for each use reason of a RACH procedure in Embodiment 3 of the invention.

In the embodiment, only boundary information is set for each reason of the RACH procedure by way of example, but the priority of MAC control element can also be changed for each use reason of the RACH procedure. In this case, as shown in FIG. 11, a priority table section 1101 may be included in place of a priority table section 702 shown in FIG. 10 and the priority for each use reason of the RACH procedure may be set in the priority table section 1101.

Figure 21:
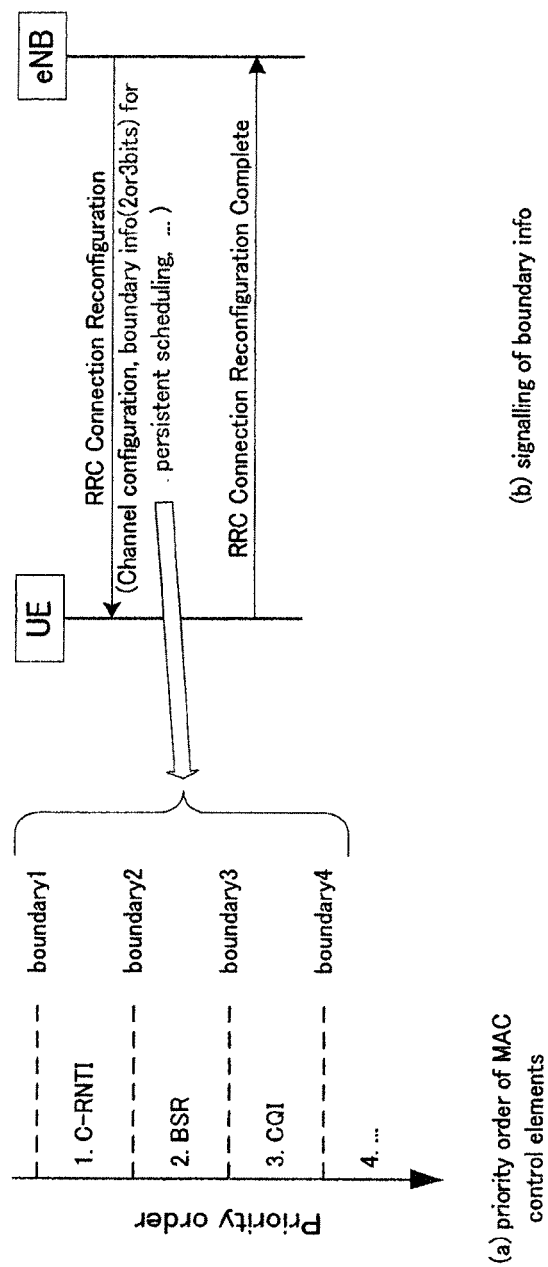
FIG. 21 shows a method of transmitting boundary information used for transmission using semi-persistent scheduling to a terminal in Embodiment 3 of the invention.

Specifically, the following examples are considered:
Handover complete: C-RNTI>BSR>CQI
UL data resuming: C-RNTI>BSR>CQI
DL data resuming: C-RNTI>CQI>BSR The operation using different priority depending on the use reason (cause) of the RACH procedure shown in the embodiment can also be applied to the case where different priority is set in dynamic scheduling and semi-persistent scheduling although the bearer is the same bearer. In E-UTRA/E-UTRAN, dynamic scheduling for assigning data in PDCCH (Physical Downlink Control Channel) each time and semi-persistent scheduling for continuing to use the resource in a given period if data is once assigned in PDCCH. The semi-persistent scheduling is suited for service in which data is sent in the same size on a regular basis such as VoIP. However, there is a problem in that if an attempt is made to transmit information of BSR, CQI, etc., taking precedence over data of VoIP, they cannot be entered in the resource assigned in the semi-persistent scheduling and data of VoIP cannot be sent at a time. Then, the priority for MAC control element is also applied to DRB and further priority setting is changed by a scheduling method for DRB, whereby the problem can be solved. Specifically, a method of transmitting boundary information used for transmission using the semi-persistent scheduling to the terminal is considered (FIG. 21). That is, if boundary 1 is indicated, in the terminal, VoIP data takes precedence over BSR and CQI only at the time of the semi-persistent scheduling, and BSR and CQI take precedence as usual in the dynamic scheduling.

Embodiment 4

Figure 12:
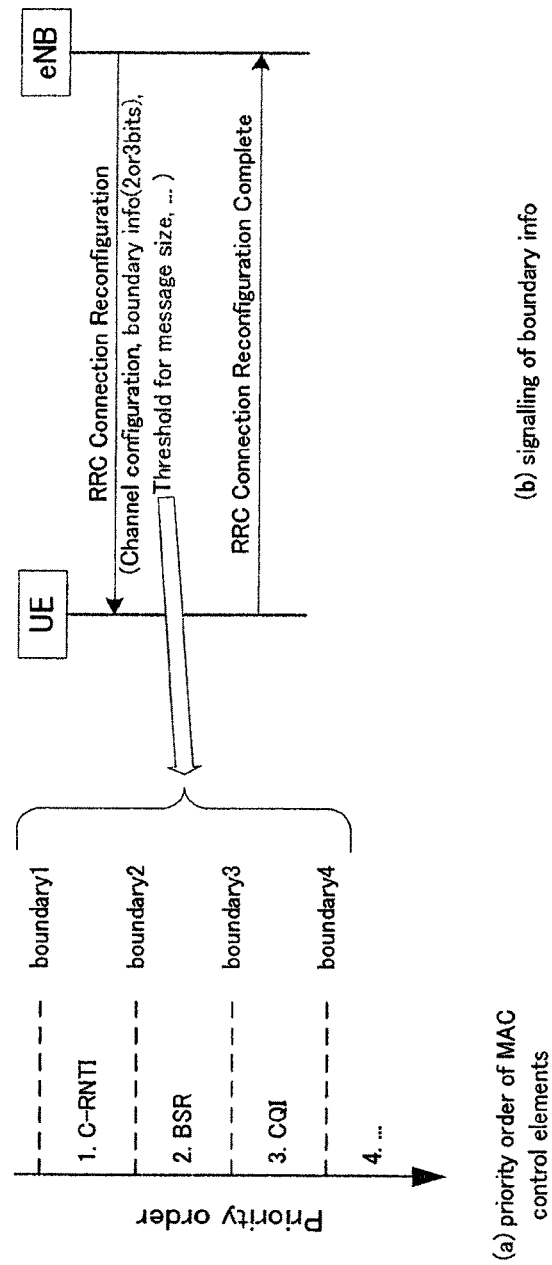
FIG. 12 shows the concept of Embodiment 4 of the invention.
Figure 13:
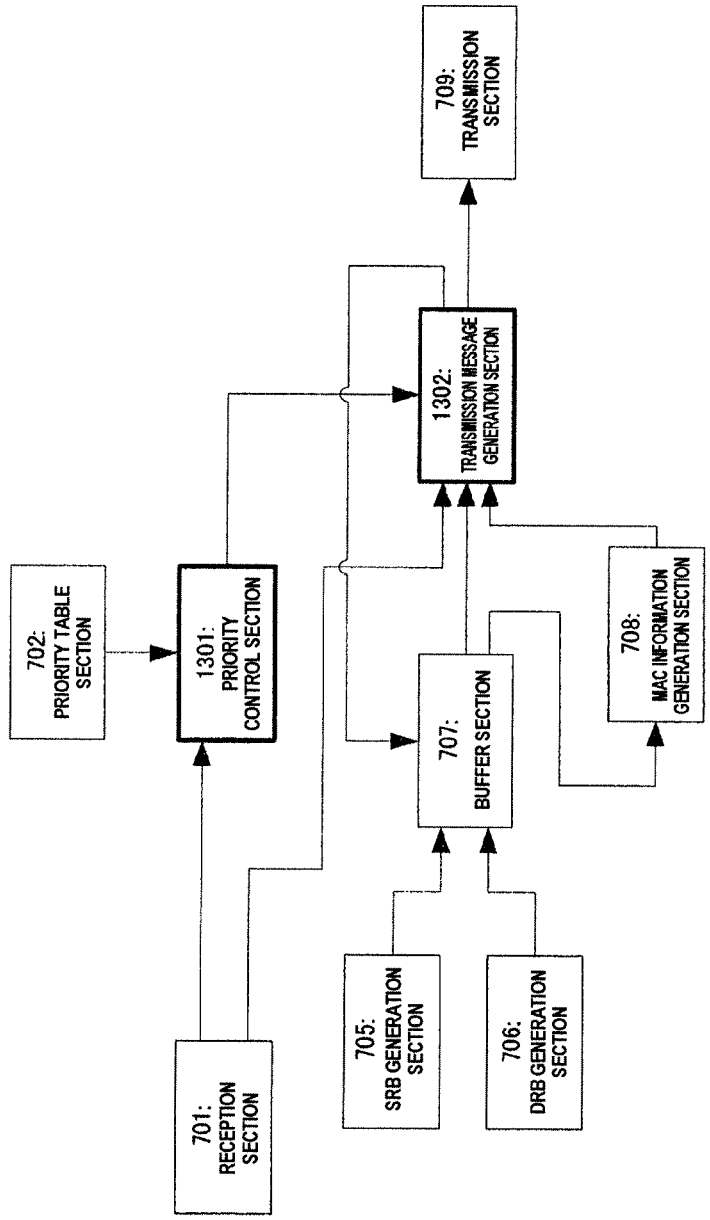
FIG. 13 is a block diagram of a terminal according to Embodiment 4 of the invention.
Figure 14:
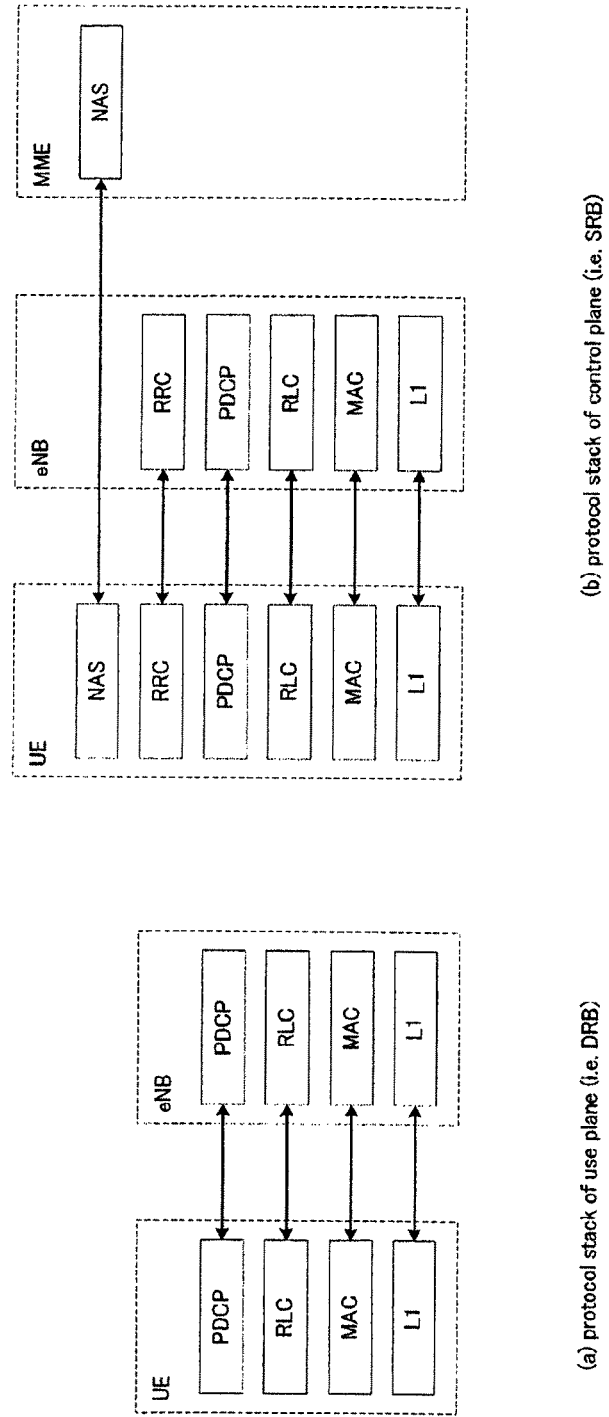
FIG. 14 shows the configuration of protocol of Message 3.
Figure 15:
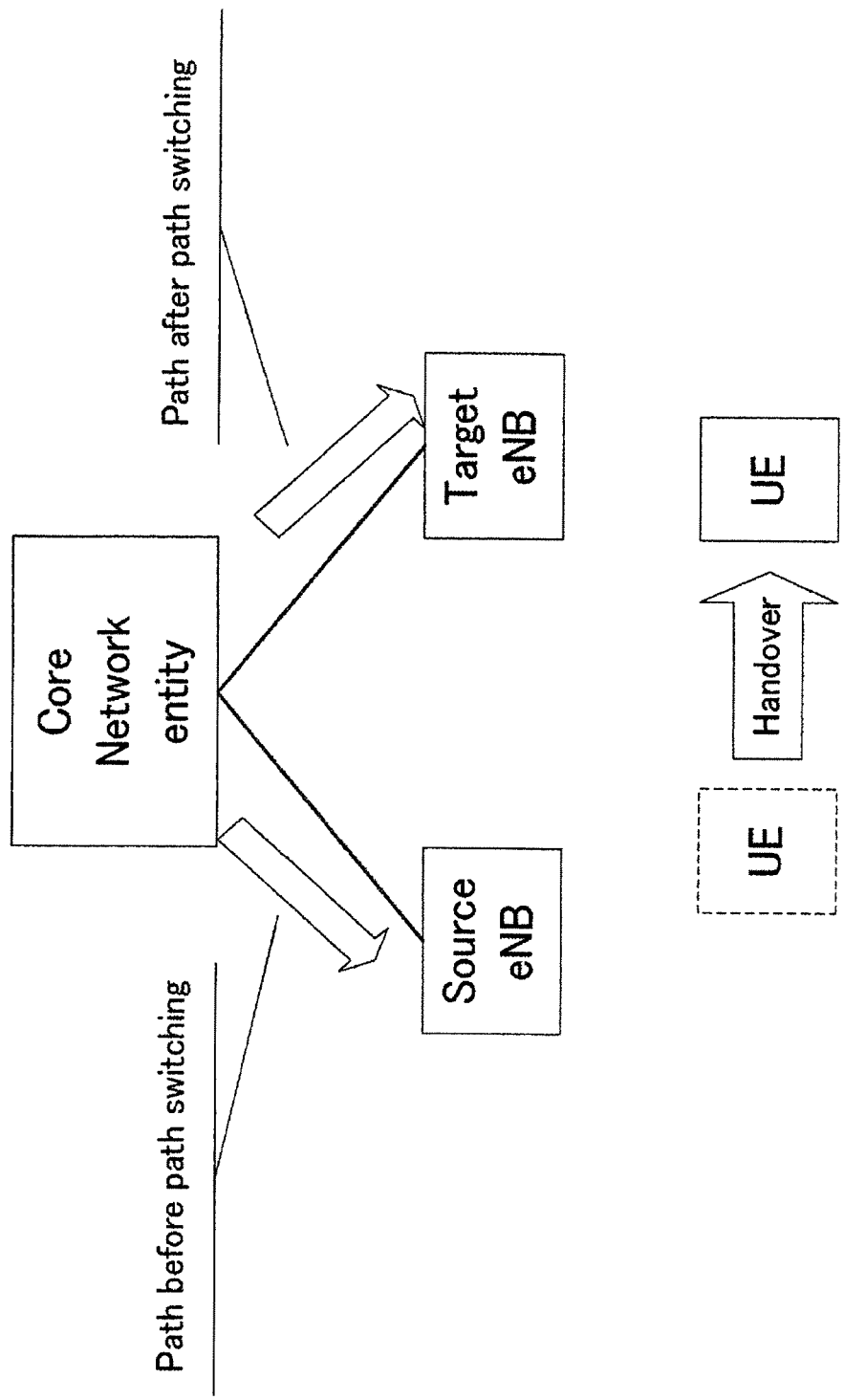
FIG. 15 shows the relationship between a base station in a network and the entity of a core network.

FIG. 12 shows the concept of Embodiment 4. FIG. 13 is a block diagram of a terminal. Embodiment 2 provides means for enabling SRB to take precedence over MAC control element. However, the size of a message taking precedence over MAC control element is large, it is considered that it is better to send MAC control element early.

Thus, in the embodiment, only if the message taking precedence over MAC control element is smaller than a predetermined size, SRB takes precedence over MAC control element. The threshold for the message size is sent together with boundary information as shown by (b) in FIG. 12.

(Block Diagram)

FIG. 13 is a block diagram of a terminal of the embodiment. The terminal shown in FIG. 13 includes a priority control section 1301 and a transmission message generation section 1302 in place of the priority control section 703 and the transmission message generation section 704 shown in FIG. 7. Only the difference will be described below: The priority control section 1301 receives and processes the threshold to determine whether or not to transmit SRB or DRB taking precedence over MAC control element and sends the threshold to the transmission message generation section 1302. The transmission message generation section 1302 determines whether or not the size of SRB or DRB taking precedence falls below the threshold and only when the size falls below the threshold, the transmission message generation section 1302 creates a transmission message so as to transmit SRB or DRB taking precedence over MAC control element.

Embodiment 5

Figure 22:
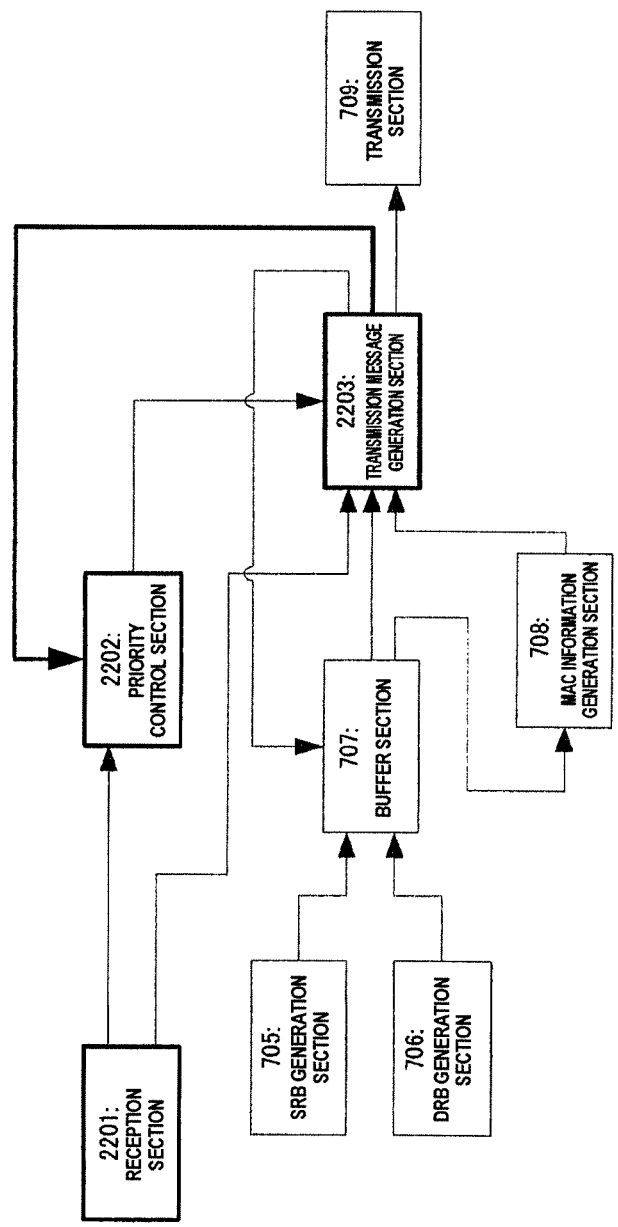
FIG. 22 is a block diagram of a terminal according to Embodiment 5 of the invention.
Figure 23:
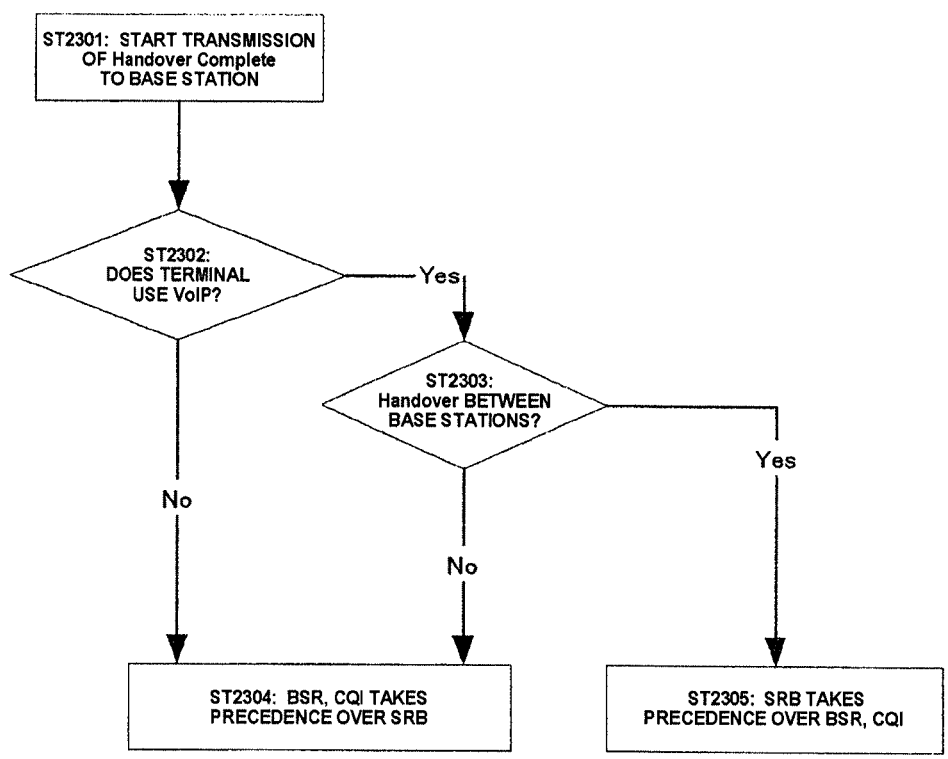
FIG. 23 is a flowchart to show the essence of operation according to Embodiment 5 of the invention.

FIG. 22 is a block diagram of a terminal of Embodiment 5 and FIG. 23 is a flowchart to show an outline of operation. Embodiment 2 shows the method of determining the priority of MAC control element and SRB according to a command from the network. Embodiment 5 shows the operation of determining the priority without a command from a network.

(Block Diagram)

FIG. 22 is a block diagram of a terminal of the embodiment. The terminal shown in FIG. 22 includes a reception section 2201, a priority control section 2202, and a transmission message generation section 2203 in place of the reception section 701, the priority control section 703, and the transmission message generation section 704.

Unlike the reception section 701, the reception section 2201 does not receive boundary information and does not report it to the priority control section 703, but sends information necessary for determining the priority of MAC control element and SRB to the priority control section 2202. The information necessary for determining the priority of MAC control element and SRB is information as to whether or not service in which packet loss increases because of path switching delay such as VoIP is received, whether Handover is Handover in a base station or Handover between base stations, etc.

Unlike the priority control section 703, the priority control section 2202 determines the priority of SRB and MAC control element based on information received from the reception section 2201. The priority is determined when the transmission message generation section 2203 creates a transmission message.

The transmission message generation section 2203 reports the contents of a message scheduled to be transmitted to the priority control section 2202. The transmission message generation section 2203 checks the priority in the priority control section 2202 each time it creates a transmission message.

(Flowchart)

FIG. 23 shows the operation of determining the priority of SRB and MAC control element based on whether or not VoIP is used and whether or not Handover is Handover between base stations when Handover complete is transmitted.

At ST2301, transmission of Handover complete from the transmission message generation section 2203 of the terminal to the base station is started. The transmission message generation section 2203 checks the priority in the priority control section 2202.

The priority control section 2202 determines whether or not VoIP is used at ST2302. If VoIP is not used, the priority control section 2202 goes to ST2304; if VoIP is used, the priority control section 2202 goes to ST2303. At ST2303, the priority control section 2202 determines whether the Handover is Handover between base stations or Handover within base station. If the Handover is Handover within base station at ST2303, the priority control section 2202 goes to ST2304; if the Handover is Handover between base stations, the priority control section 2202 goes to ST2305.

At ST2304, the priority control section 2202 determines that MAC Control element takes precedence as path switching delay caused by Handover Complete delay does not introduce a problem. Conversely, at ST2305, the priority control section 2202 determines that Handover complete takes precedence because Handover Complete delay introduces a problem. The result is reported to the transmission message generation section 2203, which then generates a transmission message based on the result.

In the embodiment, the terminal determines the priority for MAC control element of SRB based on whether or not VoIP is executed and whether or not Handover is Handover between base stations, but any other condition may be used. Specifically, it is also considered that if the move speed of the terminal is high, CQI takes precedence and if the move speed is low, CQI does not take precedence. It is also considered that if variation of the buffer state in the terminal is fierce, BSR takes precedence and variation is not fierce, BSR does not take precedence.

In the embodiment, whether or not VoIP is executed is adopted as one criterion of determination, but determination may be made simply based on whether or not service not transferred between base stations exists. DRB using UM of RLC is not transferred. Thus, whether or not DRB using UM of RLC exists can be used as a determination criterion.

Further, whether or not DRB using RLC UM is equal to or greater than one priority can be used as a determination criterion. Accordingly, determination of the priority of SRB affected by DRB of RLC UM having a low priority can be circumvented.

Embodiment 6

Figure 27:
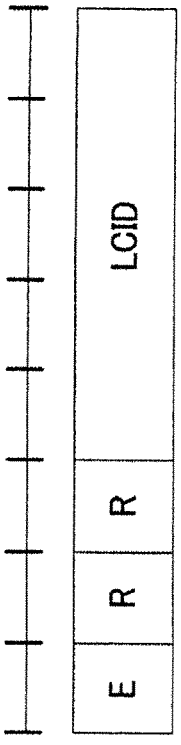
FIG. 27 shows the configuration of a MAC sub-header according to Embodiment 6 of the invention.
Figure 28:
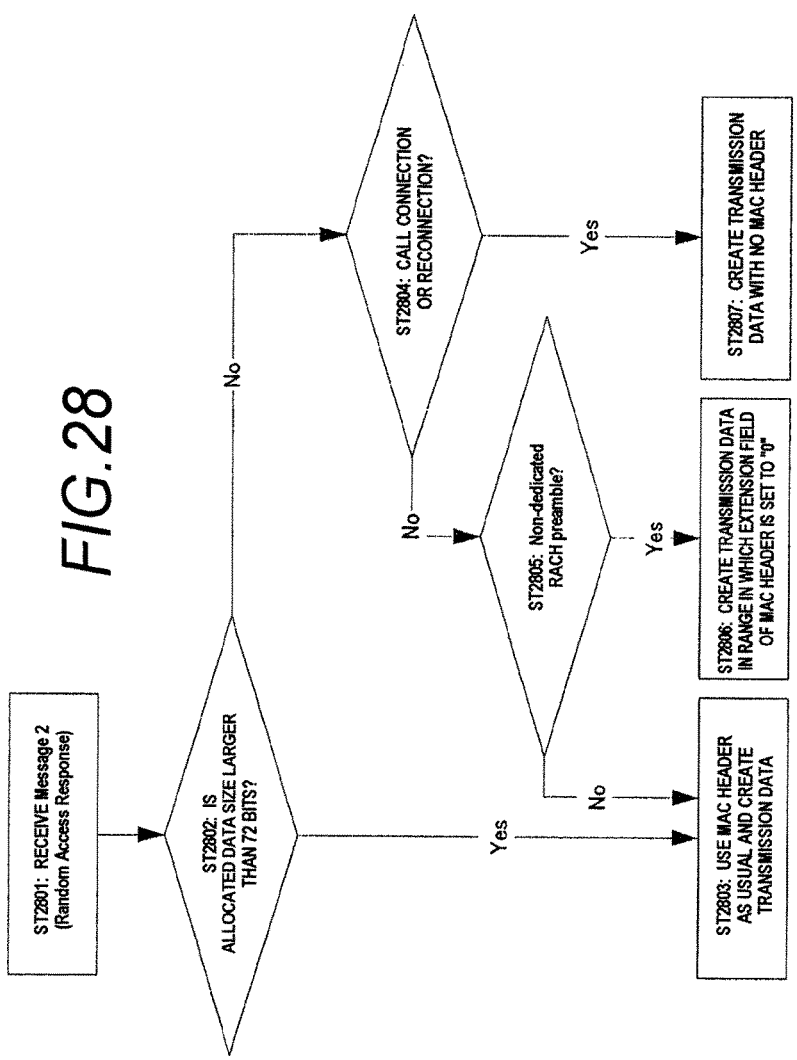
FIG. 28 is a flowchart to show an outline of the operation of a terminal according to Embodiment 6 of the invention.

FIG. 27 shows the configuration of a MAC sub-header of Embodiment 6 and FIG. 28 is a flowchart to show an outline of the operation of a terminal. The embodiment shows how a base station distinguishes the description when a terminal selects RACH preamble transmitted to the base station on its own (non-dedicated RACH preamble case).

Figure 1:
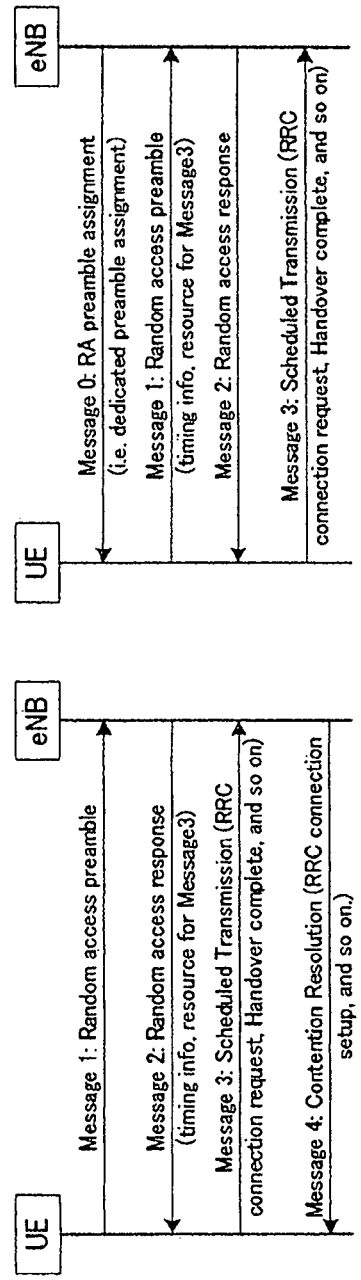
FIG. 1 shows the operation of non-dedicated RACH preamble and dedicated RACH preamble.
Figure 2:
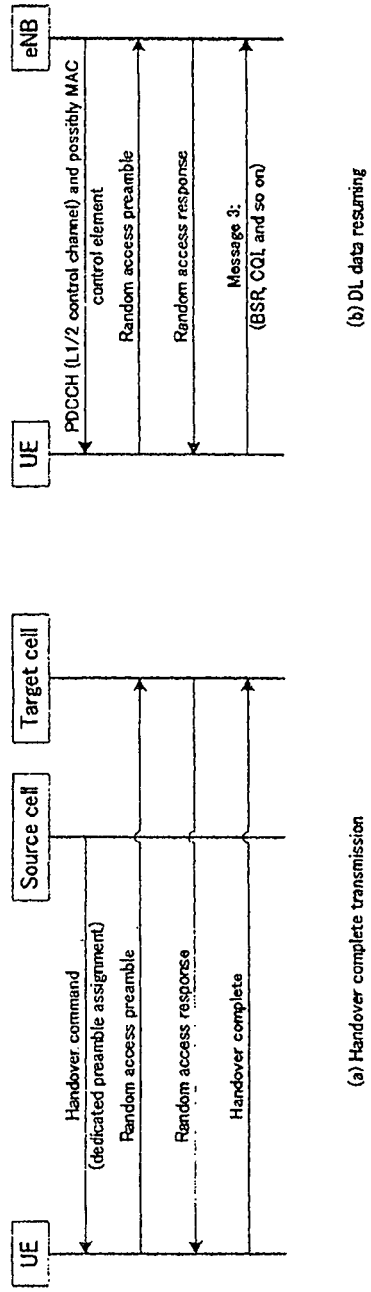
FIG. 2 shows procedures of handover complete transmission and DL data resuming.
Figure 3:
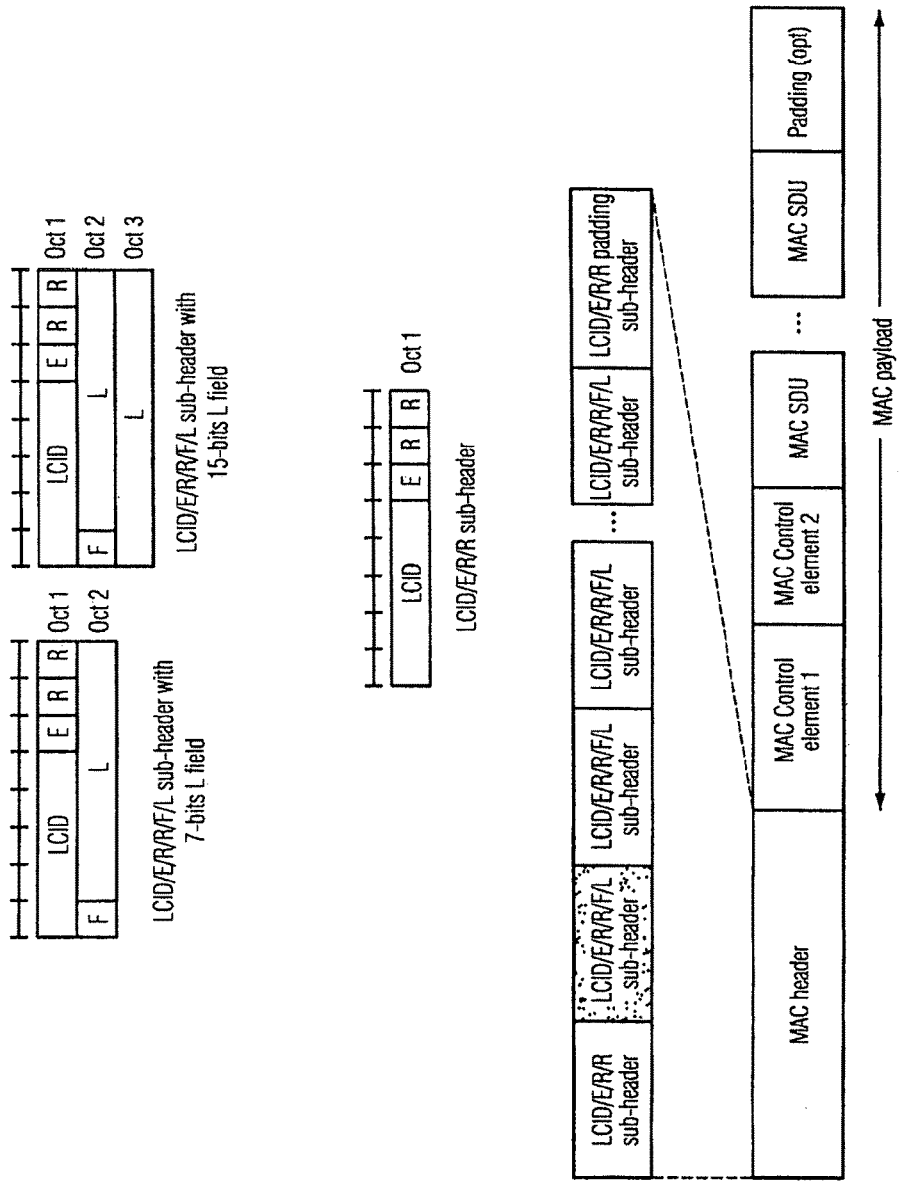
FIG. 3 shows the header configuration of MAC of Message 3.
Figure 4:
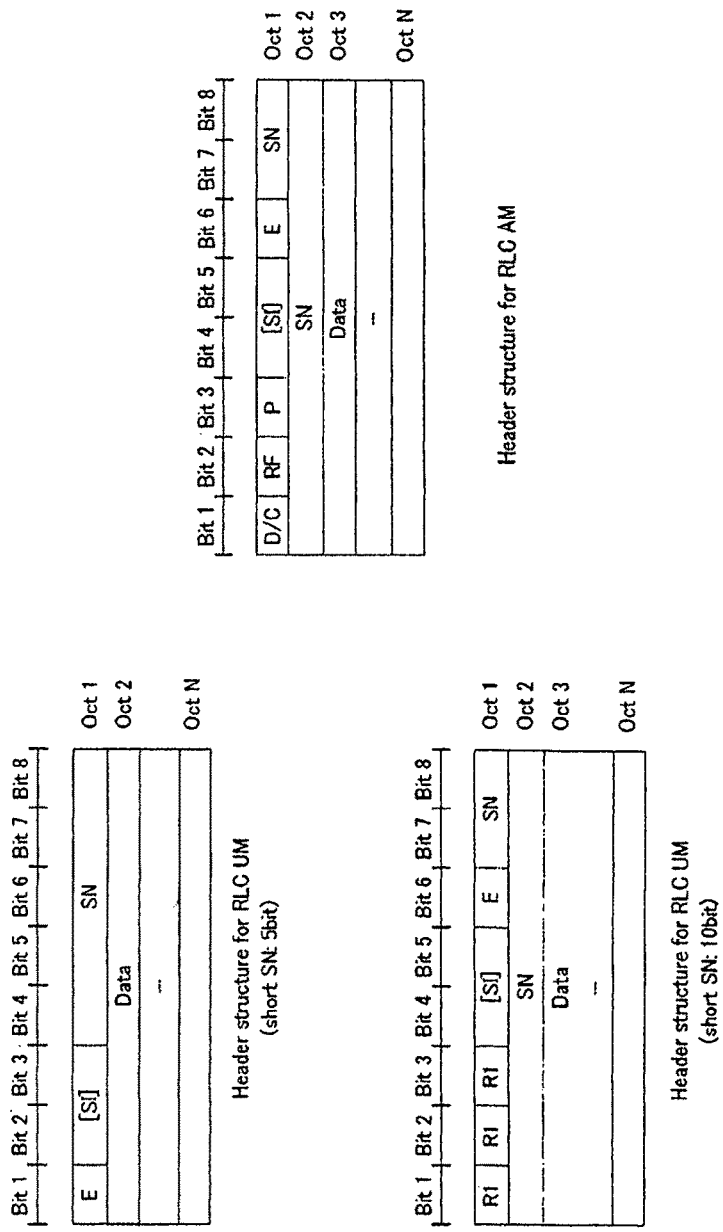
FIG. 4 shows the header configuration of RLC of Message 3.
Figure 5:
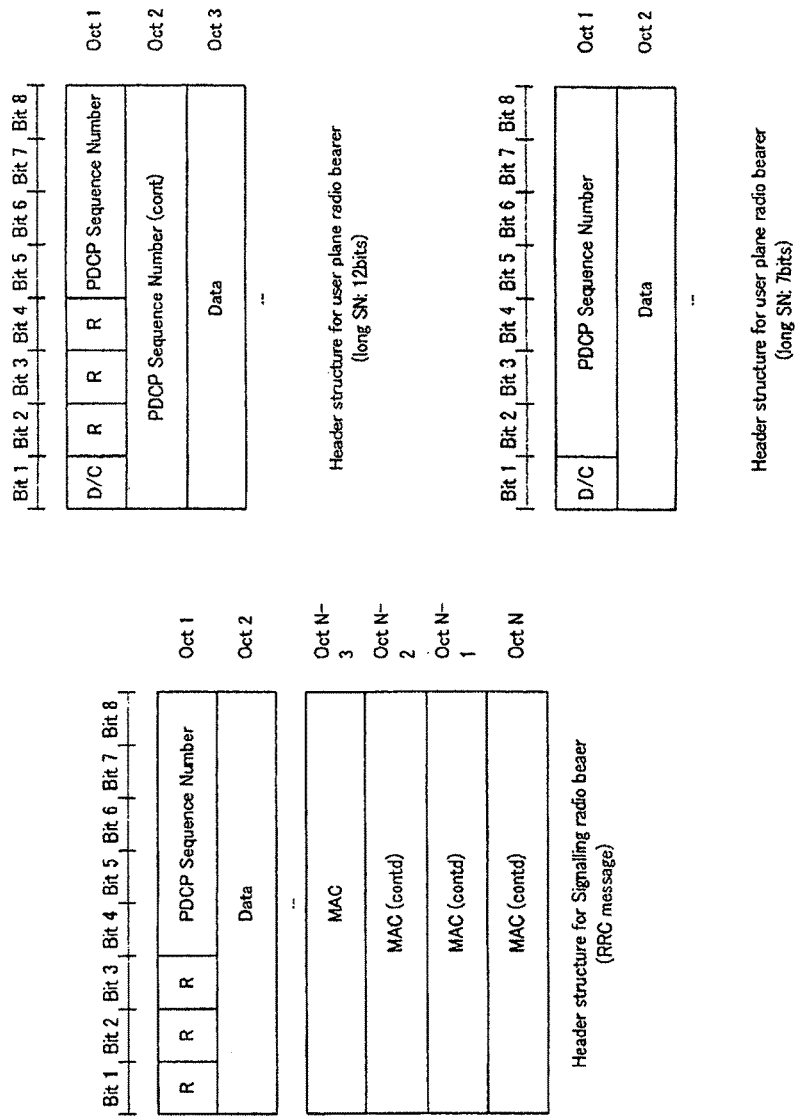
FIG. 5 shows the header configuration of PDCP of Message 3.

When a terminal selects RACH preamble transmitted to the base station on its own, the base station does not understand whether the terminal wants to execute initial access, wants to transmit Handover complete, or else if it receives only RACH preamble (Message 1 shown by (a) in FIG. 1). Thus, the base station knows what the description of Message 3 shown by (a) in FIG. 1 is at the point in time receiving Message 3. At this time, one problem exists. It is caused by the fact that whether or not header of MAC is used in Message 3 varies depending on a condition. Specifically, if a resource for only sending 72-bit information to the terminal is allocated, header of MAC is not contained and directly RRC message is contained in the case of call connection, or reconnection; header of MAC is contained in Handover complete transmission, UL/DL data transmission-reception resuming. If a resource for sending 144-bit information, for example, larger than 72 bits is allocated, MAC header is contained even in the case of call connection, reconnection. Thus, the base station needs to determine whether or not MAC header is contained if 72 bits only are allocated to the terminal.

To solve this, non-patent document (R2-080162: Message 3 encoding) makes two propositions.

(Conventional Proposition 1)

Figure 25:
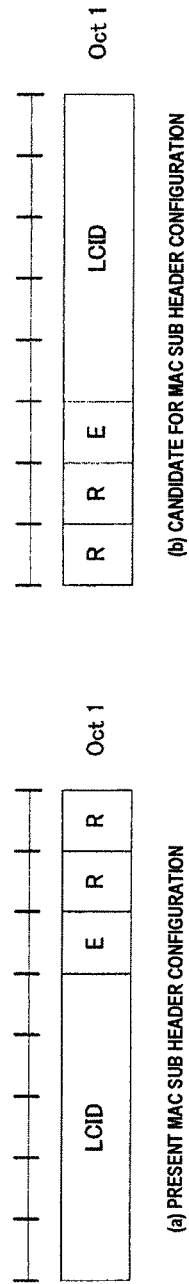
FIG. 25 shows the configuration of a MAC sub-header used in a conventional proposition.

The first proposition uses the configuration of the present MAC sub-header (see (a) in FIG. 25) described in non-patent document (T536.321 V8.0.0: "Evolved Universal Terrestrial Radio Access (E-UTRA); Medium Access Control (MAC) protocol specification") and uses an LCID (Logical Channel IDentifier) field (LCID field) at the top. The LCID field is a location to enter LCID corresponding to carried data or LCID corresponding to MAC control element and according to this, the reception party can identify what the received data is.

As a specific method described in the document, the first two bits of five-bit LCID are used to indicate whether or not MAC header exists; for example, if the value of the first two bits is "11," it is assumed that MAC header exists and if the value is "00," "01," or "10" other than "11," it is assumed that MAC header does not exist. In the case of RRC message in call connection, reconnection, namely, RRC CONNECTION REQUEST, RRC CONNECTION RE-ESTABLISHMENT REQUEST, it is considered that the first two bits are used as Message type indicating RRC message. Thus, if the value is "00," "01," or "10," the message received in RRC is identified as RRC CONNECTION REQUEST, RRC CONNECTION RE-ESTABLISHMENT REQUEST. For example, if the value is "00," the message is RRC CONNECTION REQUEST and if the value is "01," the message is RRC CONNECTION RE-ESTABLISHMENT REQUEST.

As the disadvantage in this case, the area that can be indicated in LCID is limited. If the terminal selects RACH preamble transmitted to the base station on its own, it needs to report C-RNTI the base station and the information must be contained. Thus, it becomes necessary to reserve eight LCIDs of 32 for MAC control element containing C-RNTI. In fact, however, it is considered that eight MAC control elements containing C-RNTI are not defined, and thus LCIDs are reserved fruitlessly.

Figure 26:
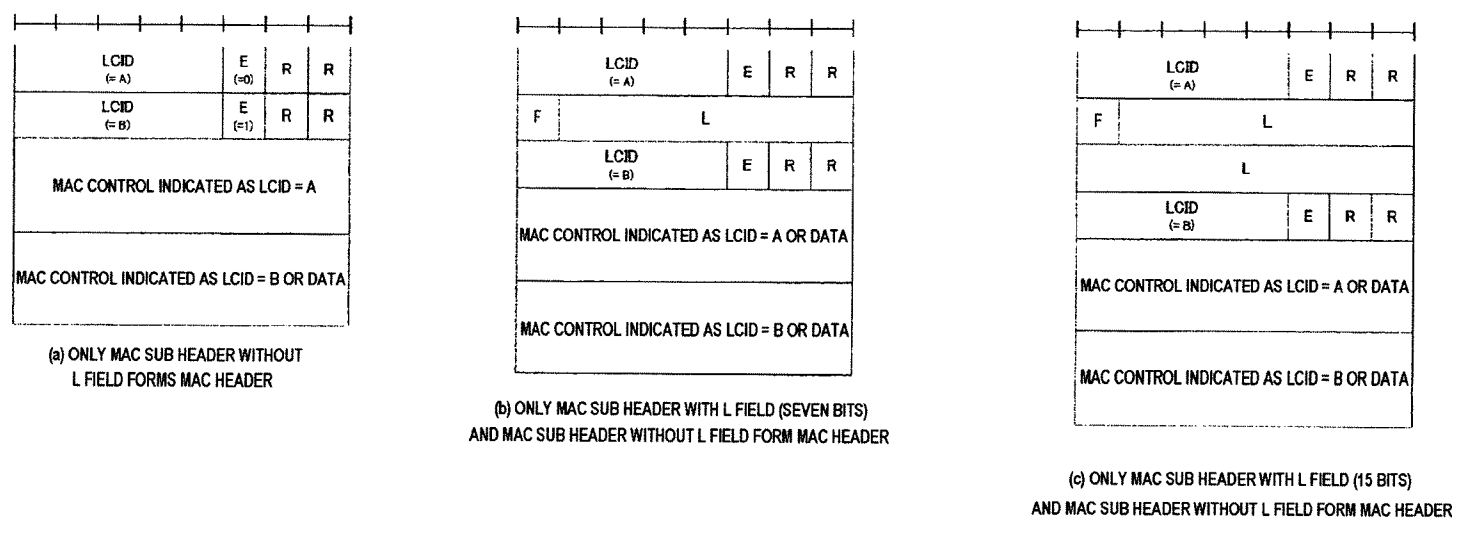

Here, other fields in the MAC sub-header will be described. An extension field (E) indicates whether or not MAC sub-header further continues. If the value is "0," it indicates that data or MAC control element is entered; if the value is "1," it indicates that MAC sub-header continues. FIG. 26 shows a configuration example wherein a plurality of MAC sub-headers continue. In FIG. 26, (a) shows an example wherein only a MAC sub-header without a length field (L field) shown in FIG. 25 forms MAC header. The length field indicates the size of data to be sent and enables the reception party to know where the next data or MAC control element begins. The MAC control element has a fixed length and the length field is not required and the last data is not followed by any data and thus the length field need not be entered. There are the two types of length fields: 7-bit length field ((b) in FIG. 26) and 15-bit length field ((c) in FIG. 26). A format field (F field) indicates which of the two types is used. A reserved bit (R bit) is defined for later extension.

(Conventional Proposition 2)

The second proposition uses another MAC header configuration (see (b) in FIG. 25). The first reserved bit is used to indicate whether or not MAC header exists. That is, if the value is "0," MAC header exists and if the value is "1," MAC header does not exist. In RRC, the first bit is always set to "1" and thus only "10" and "11" can be used for identifying the Message type. If the value is "10," the Message type is RRC CONNECTION REQUEST and if the value is "11," the Message type is RRC CONNECTION RE-ESTABLISHMENT REQUEST.

The problem in this case exists in that all Message types are used and thus new RRC message cannot be defined. Thus, it is desirable that the range that can be defined as LCID is not used fruitlessly and an area that can be used for Message type is ensured so that a new RRC message can be defined.

This Embodiment

As shown in FIG. 27, the configuration of the MAC header in the embodiment is characterized in that the extension field exists at the top and whether or not MAC header exists can be determined by the value of the extension field. The feature that if only 72 bits are allocated for transmission, the necessity for using a plurality of MAC sub-headers is small is utilized and if MAC header exists, the extension field is always set to "0" and only one MAC sub-header is used. Therefore, if the extension field is set to "0," the reception party performs processing as MAC header exists and if the extension field is set to "1," the reception party assumes that MAC header does not exist and performs processing in RRC as RRC message. In RRC, the first two bits are used to identify the message. As a specific example, if the value of the first two bits "10," the message is RRC CONNECTION REQUEST and if the value is "11," the message is RRC CONNECTION RE-ESTABLISHMENT REQUEST.

In the system, the bit is the second bit of the MAC header, but not used as MAC and is a reserved bit. Thus, for extension in MAC in the future, the reserved bit can be used. Conversely, if an RRC message needs to be added, the bit can be used. Specifically, whether or not MAC header exists is not checked using the extension field only and when the extension field and the reserved bit corresponding to the first two bits of the MAC header are checked, if the value is "00," it is determined that no MAC header exists. Accordingly, the three values of "01," "10," and "11" can be used to indicate the RRC message. Thus, in the system, the extension field is used to identify the presence or absence of MAC header, whereby extension of MAC or addition of RRC message is made possible.

The operation of the terminal according to the embodiment will be described below with FIG. 28:

At ST2801, the terminal checks the size allocated in Random Access Response. If the allocated size is larger than 72 bits, the process goes to ST2803. If 72 bits are allocated, the process goes to ST2804. At ST2804, the terminal determines whether call connection or reconnection is executed. That is, the terminal determines whether or not MAC header is used. To use MAC header, the process goes to ST2805; not to use MAC header, the process goes to ST2806. When the process goes to ST2805, if the terminal selects RACH preamble on its own (namely, Non-dedicated RACH preamble), the process goes to ST2806; if RACH preamble given from the base station is used, the process goes to ST2803.

At ST2803, the terminal uses MAC header as usual and creates transmission data. On the other hand, at ST2806, the terminal creates transmission data so that the first extension field of MAC header is set to "0." In FIGS. 29, (c), (d), (e), and (f) show MAC header configuration examples at this time. FIG. 30 shows a definition example of LCID.

In FIG. 29, (c) shows the case where only C-RNTI is transmitted. Here, 16 bits of 40 bits are used as C-RNTI and the remaining 24 bits are padding. Thus, LCID (11000 in FIG. 30) indicating that C-RNTI and padding are entered is entered.

In FIG. 29(*d*), C-RNTI and BSR are transmitted and LCID (11001 in FIG. 30) indicating that C-RNTI and BSR are entered is entered. This is used when BSR takes precedence over handover complete.

In FIG. 29(*e*), C-RNTI and DCCH (Dedicated Control Channel) is transmitted. Here, DCCH is a name as Logical channel of SRB described above and is separated into a plurality of DCCHs as SRB is separated into high priority SRB and low priority SRB. LCID can be defined as it indicates only that C-RNTI and high priority SRB are transmitted later; conversely, LCID can be defined as it indicates only that C-RNTI and low priority SRB are transmitted later, or both may be defined. FIG. 30 shows an example wherein both are defined. LCID responsive to actually transmitted DCCH is set (11010 or 11011 in FIG. 30).

In FIG. 29(*f*), C-RNTI and CQI are transmitted. Thus, LCID (11100 in FIG. 30) indicating that C-RNTI and CQI are entered is entered.

At ST2807, the terminal transmits a message with no MAC header. Examples of transmission data at the time are shown by (a) and (b) in FIG. 29 as the call connection time and reconnection time. Locations of information other than Message type may be different locations.

According to the operation of the embodiment, the range that can be defined as LCID is not used fruitlessly and it is made possible to ensure an area that can be used for Message type so that a new RRC message can be defined.

In the description given above, LCID is defined so as to combine C-RNTI and any other information by way of example, but any other method is also possible. If the terminal selects RACH preamble on its own, the base station can predict that the terminal enters C-RNTI in Message 3. Thus, if operation is predetermined so as to enter C-RNTI following MAC header whenever the terminal selects RACH preamble on its own, the need for defining LCID so as to combine C-RNTI and any other information is eliminated. Specifically, FIG. 31 shows examples. In FIG. 31, (*a*) shows the case where only C-RNTI is entered and the remainder is padding. In this case, the terminal enters LCID indicating padding as LCID. If the terminal selects RACH preamble on its own, the base station understand that C-RNTI is always entered following MAC header and it is made possible for the base station to understand that RNTI comes following MAC header, followed by padding. Other cases are shown by (b), (c), and (d) in FIG. 31; the operation is similar and it is made possible for the base station to understand that C-RNTI exists and is followed by information indicated in LCID.

C-RNTI is entered just after MAC header by way of example, but can also be set in any other location.

This application is based on Japanese Patent Application No. 2008-023171 filed on Feb. 1, 2008, the contents of which are incorporated herein by reference.

While various embodiments of the invention have been described, it is to be understood that the invention is not limited to the items shown in the embodiments described above and the invention is also intended for those skilled in the art to make modifications and application based on the Description of the invention and well-known arts and the modifications and the application are contained in the scope to seek protection.

INDUSTRIAL APPLICABILITY

The invention can be used as a communication terminal, a base station, etc., that can assign priority to MAC control information and can control what information is to be transmitted as desired.

What is claimed is:

1. A communication terminal for communicating with a base station, the communication terminal comprising:
 a memory configured to store information relating to a priority of control information to be transmitted to the base station, the priority of control information being in accordance with a first priority of medium access control (MAC) control information individually assigned to plural MAC control elements and a second priority information individually assigned to plural signaling radio bearer (SRB) elements for transmitting radio resource control (RRC) control information, wherein the priority information individually assigned to plural signaling radio bearer (SRB) elements is separate from the priority of medium access control (MAC) control information individually assigned to plural MAC control elements;
 a priority controller configured:
  to retrieve the information relating to the priority of control information from the memory;
  to process the retrieved information relating to the priority of control information so as to generate the priority of control information; and
  to generate a transmission message in consideration with the priority of control information; and
 a transmitter configured to transmit the transmission message to the base station.

2. The communications terminal of claim 1, wherein the plural MAC control elements include a terminal identifier and a buffer status report (BSR).

3. The communications terminal of claim 2, wherein the terminal identifier is a controlling radio network temporary ID (C-RNTI).

4. The communications terminal of claim 1, wherein the transmission message is included in a random access Channel (RACH) procedure.

5. The communications terminal of claim 1, wherein the priority controller is configured to generate the transmission message to include the plural MAC control elements and the plural SRB elements in a priority order in accordance with the respectively assigned priorities of the elements.

6. A communication method in a communication terminal for communicating with a base station, the communication method comprising:
 storing information relating to a priority of control information to be transmitted to the base station, the priority of control information being in accordance with a first priority of medium access control (MAC) control information individually assigned to plural MAC control elements and a second priority information individually assigned to plural signaling radio bearer (SRB) elements for transmitting radio resource control (RRC) control information, wherein the priority information individually assigned to plural signaling radio bearer (SRB) elements is separate from the priority of medium access control (MAC) control information individually assigned to plural MAC control elements;
 retrieving the information relating to the priority of control information from the memory;

processing the retrieved information relating to the priority of control information so as to generate the priority of control information;

generating a transmission message in consideration with the priorities of the MAC control elements; and transmitting the transmission message to the base station.

7. The method of claim 6, wherein the plural MAC control elements include a terminal identifier and a buffer status report (BSR).

8. The method of claim 7, wherein the terminal identifier is a controlling radio network temporary ID (C-RNTI).

9. The method of claim 6, wherein the transmission message is included in a random access Channel (RACH) procedure.

10. The method of claim 6, further comprising generating the transmission message to include the plural MAC control elements and the plural SRB elements in a priority order in accordance with the respectively assigned priorities of the elements.

11. A communication terminal for communicating with a base station, the communication terminal comprising:

a memory configured to store information relating to a priority of control information to be transmitted to the base station, the priority of control information being in accordance with a first priority of medium access control (MAC) control information individually assigned to plural MAC control elements and a second priority information individually assigned to plural signaling radio bearer (SRB) elements for transmitting radio resource control (RRC) control information, wherein the priority information individually assigned to plural signaling radio bearer (SRB) elements is separate from the priority of medium access control (MAC) control information individually assigned to plural MAC control elements;

a priority controller configured to retrieve the information relating to the priority of control information from the memory, and, to process the retrieved information relating to the priority of control information so as to generate the priority of control information in accordance with the first priority of medium access control (MAC) control information individually assigned to plural MAC control elements and the second priority information individually assigned to plural signaling radio bearers (SRBs) for transmitting radio resource control (RRC) control information; and a transmitter configured to transmit a transmission comprising the plural MAC control elements and the plural signaling radio bearers (SRBs) in consideration with the priority of control information.

* * * * *